(12) United States Patent
Xu et al.

(10) Patent No.: US 12,107,534 B2
(45) Date of Patent: Oct. 1, 2024

(54) PHOTOVOLTAIC SYSTEM, INVERTER, AND BUS VOLTAGE CONTROL METHOD FOR INVERTER

(71) Applicant: Huawei Digital Power Technologies Co., Ltd., Shenzhen (CN)

(72) Inventors: Zhiwu Xu, Shenzhen (CN); Guilei Gu, Shanghai (CN); Xiaofeng Yao, Shenzhen (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 114 days.

(21) Appl. No.: 17/994,632

(22) Filed: Nov. 28, 2022

(65) Prior Publication Data

US 2023/0170844 A1 Jun. 1, 2023

(30) Foreign Application Priority Data

Nov. 29, 2021 (CN) .......................... 202111438393.0

(51) Int. Cl.
*H02S 40/32* (2014.01)
*G05F 1/67* (2006.01)
*H02J 1/14* (2006.01)
*H02J 7/35* (2006.01)

(52) U.S. Cl.
CPC ................ *H02S 40/32* (2014.12); *G05F 1/67* (2013.01); *H02J 1/14* (2013.01); *H02J 7/35* (2013.01); *H02J 2300/26* (2020.01)

(58) Field of Classification Search
CPC ..... H02S 40/32; H02J 1/14; H02J 7/35; H02J 2300/26; G05F 1/67
See application file for complete search history.

(56) References Cited

U.S. PATENT DOCUMENTS

2010/0133904 A1* 6/2010 Klodowski ............... H02J 3/50
307/24

* cited by examiner

*Primary Examiner* — Robert L Deberadinis
(74) *Attorney, Agent, or Firm* — Maier & Maier, PLLC

(57) ABSTRACT

A photovoltaic system includes at least one DC/DC converter and the inverter. An input terminal of the at least one DC/DC converter is configured to connect to a photovoltaic module, an output terminal is configured to connect to an input terminal of the inverter by using a direct current bus, and an output terminal of the inverter is connected to an alternating current grid. When the inverter is switched from a non-power-limited working state to a power-limited working state, the inverter adjusts a bus voltage of the inverter to rise from a first voltage to a second voltage. After running in the power-limited working state for a time interval, the inverter adjusts the bus voltage to drop from the second voltage to a third voltage, where the third voltage is less than or equal to the first voltage.

17 Claims, 8 Drawing Sheets

PHOTOVOLTAIC SYSTEM, INVERTER, AND BUS VOLTAGE CONTROL METHOD FOR INVERTER

CROSS-REFERENCE TO RELATED APPLICATION

This application claims priority to Chinese Patent Application No. 202111438393.0, filed on Nov. 29, 2021, which is hereby incorporated by reference in its entirety.

TECHNICAL FIELD

The embodiments relate to the field of power supply technologies, a photovoltaic system, an inverter, and a bus voltage control method for an inverter.

BACKGROUND

Currently, an inverter mainly controls a bus voltage based on a working state of the inverter. When the working state of the inverter changes, the bus voltage also changes greatly. In this manner, when the working state of the inverter is switched between a power-limited working state and a non-power-limited working state, stability of the inverter deteriorates, for example, the inverter is likely to be affected by a fluctuation of an alternating current grid.

SUMMARY

The embodiments may provide a photovoltaic system, an inverter, and a bus voltage control method for an inverter, to improve stability of the inverter, so as to improve stability of the photovoltaic system and implement high applicability.

According to a first aspect, the embodiments may provide a photovoltaic system. The photovoltaic system includes at least one DC/DC converter and an inverter. An input terminal of the at least one DC/DC converter is configured to be connected to a photovoltaic module, an output terminal is configured to be connected to an input terminal of the inverter by using a direct current bus, and an output terminal of the inverter is connected to an alternating current grid. When the inverter is switched from a non-power-limited working state to a power-limited working state, the inverter adjusts a bus voltage of the inverter to rise from a first voltage to a second voltage. After running in the power-limited working state for a time interval, the inverter adjusts the bus voltage to drop from the second voltage to a third voltage. The third voltage is less than or equal to the first voltage. Therefore, through short-term adjustment of the bus voltage, it is ensured that a difference between a bus voltage that exists before the inverter is switched from the non-power-limited working state to the power-limited working state and a bus voltage that exists after the inverter is switched from the non-power-limited working state to the power-limited working state is reduced, so that the bus voltage of the inverter does not change greatly due to a change in a working state of the inverter. In this way, stability of the inverter can be improved, and therefore stability of the photovoltaic system is improved, and there is high applicability.

With reference to the first aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the first voltage is obtained by the inverter through controlling based on an input voltage reference value of the DC/AC circuit that exists when the inverter is in the non-power-limited working state, and the second voltage is obtained by the inverter through controlling based on a sum of output voltage reference values of the at least one DC/DC converter that exist when the inverter is in the non-power-limited working state. It may be understood that the inverter may set that when the inverter is in the non-power-limited working state, the input voltage reference value of the DC/AC circuit is the first voltage, and the sum of the output voltage reference values of the at least one DC/DC converter is the second voltage, the bus voltage that exists when the inverter is in the power-limited working state is a sum of output voltages of the at least one DC/DC converter, and the bus voltage that exists when the inverter is in the non-power-limited working state is an input voltage of the DC/AC circuit, so that when the working state of the inverter is switched from the non-power-limited working state to the power-limited working state due to impact of an external factor, it is ensured that the bus voltage of the inverter rises from the first voltage to the second voltage.

With reference to the first aspect, in a second possible implementation, the inverter adjusts the sum of the output voltage reference values of the at least one DC/DC converter to the input voltage reference value of the DC/AC circuit that exists when the inverter is in the non-power-limited working state, and adjusts the sum of the output voltages of the at least one DC/DC converter based on the sum of the output voltage reference values of the at least one DC/DC converter. The bus voltage that exists when the inverter is in the power-limited working state is the sum of the output voltages of the at least one DC/DC converter. It may be understood that in the manner in which the sum of the output voltage reference values of the at least one DC/DC converter is adjusted to be consistent with the input voltage reference value of the DC/AC circuit that exists when the inverter is in the non-power-limited working state, it can be ensured that the bus of the inverter drops from the second voltage to the first voltage, and therefore it is ensured that after the inverter is switched from the non-power-limited working state to the power-limited working state, the bus voltage of the inverter is always controlled to be the first voltage. In this way, stability of the inverter can be improved, and therefore stability of the photovoltaic system is improved, and there is high applicability.

With reference to the first aspect, in a third possible implementation, after the inverter is in the power-limited working state for a time interval, the inverter further adjusts the input voltage reference value of the DC/AC circuit to a fourth voltage and adjusts the input voltage of the DC/AC circuit based on the input voltage reference value of the DC/AC circuit. The fourth voltage is less than the input voltage reference value of the DC/AC circuit that exists when the inverter is in the non-power-limited working state.

With reference to the first aspect, in a fourth possible implementation, the third voltage is greater than a peak voltage of the alternating current grid, and a first difference between the third voltage and the peak voltage is less than a first difference threshold. Therefore, a case in which there is an excessively large difference between the bus voltage and the peak voltage of the alternating current grid can be avoided. In this way, stability and conversion efficiency of the inverter can be effectively improved, and therefore stability and working efficiency of the photovoltaic system are improved, and there is high applicability.

With reference to the first aspect, in a fifth possible implementation, the first difference between the third voltage and the peak voltage of the alternating current grid is greater than a second difference threshold, and the second difference threshold is less than the first difference threshold. Therefore, a case in which the inverter cannot normally output a sine-wave alternating current due to an excessively small difference between the bus voltage and the peak voltage of the alternating current grid can be effectively avoided. In this way, stability of the inverter can be improved, and therefore stability of the photovoltaic system is improved.

According to a second aspect, the embodiments may provide a photovoltaic system. The photovoltaic system includes an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid. When the inverter is switched from a non-power-limited working state to a power-limited working state, the inverter adjusts a bus voltage of the inverter to rise from a first voltage to a second voltage. After running in the power-limited working state for a time interval, the inverter adjusts the bus voltage to drop from the second voltage to a third voltage. The third voltage is less than or equal to the first voltage. Therefore, through short-term adjustment of the bus voltage, it is ensured that a difference between a bus voltage that exists before the inverter is switched from the non-power-limited working state to the power-limited working state and a bus voltage that exists after the inverter is switched from the non-power-limited working state to the power-limited working state is reduced, so that the bus voltage of the inverter does not change greatly due to a change in a working state of the inverter. In this way, stability of the inverter can be improved, and therefore stability of the photovoltaic system is improved, and there is high applicability.

With reference to the second aspect, in a first possible implementation, the first voltage is obtained by the inverter through controlling based on an input voltage reference value of the DC/AC circuit that exists when the inverter is in the non-power-limited working state, and the second voltage is obtained by the inverter through controlling based on an output voltage reference value of the DC/DC circuit that exists when the inverter is in the non-power-limited working state. It may be understood that the inverter may set that when the inverter is in the non-power-limited working state, the input voltage reference value of the DC/AC circuit is the first voltage, and the output voltage reference value of the DC/DC circuit is the second voltage, the bus voltage that exists when the inverter is in the power-limited working state is an output voltage of the DC/DC circuit, and the bus voltage that exists when the inverter is in the non-power-limited working state is an input voltage of the DC/AC circuit, so that when the working state of the inverter is switched from the non-power-limited working state to the power-limited working state due to impact of an external factor, it is ensured that the bus voltage of the inverter rises from the first voltage to the second voltage.

With reference to the second aspect, in a second possible implementation, the inverter adjusts the output voltage reference value of the DC/DC circuit to the input voltage reference value of the DC/AC circuit that exists when the inverter is in the non-power-limited working state, and adjusts the output voltage of the DC/DC circuit based on the output voltage reference value of the DC/DC circuit. The bus voltage that exists when the inverter is in the power-limited working state is the output voltage of the DC/DC circuit. It may be understood that in the manner in which the output voltage reference value of the DC/DC circuit is adjusted to be consistent with the input voltage reference value of the DC/AC circuit that exists when the inverter is in the non-power-limited working state, it can be ensured that a bus of the inverter drops from the second voltage to the first voltage, and therefore it is ensured that after the inverter is switched from the non-power-limited working state to the power-limited working state, the bus voltage of the inverter is always controlled to be the first voltage. In this way, stability of the inverter can be improved, and therefore stability of the photovoltaic system is improved, and there is high applicability.

With reference to the second aspect, in a third possible implementation, the third voltage is greater than a peak voltage of the alternating current grid, and a first difference between the third voltage and the peak voltage is less than a first difference threshold. Therefore, a case in which there is an excessively large difference between the bus voltage and the peak voltage of the alternating current grid can be avoided. In this way, stability and conversion efficiency of the inverter can be effectively improved, and therefore stability and working efficiency of the photovoltaic system are improved, and there is high applicability.

With reference to the second aspect, in a fourth possible implementation, the first difference between the third voltage and the peak voltage of the alternating current grid is greater than a second difference threshold, and the second difference threshold is less than the first difference threshold. Therefore, a case in which the inverter cannot normally output a sine-wave alternating current due to an excessively small difference between the bus voltage and the peak voltage of the alternating current grid can be effectively avoided. In this way, stability of the inverter can be improved, and therefore stability of the photovoltaic system is improved.

According to a third aspect, the embodiments may provide a photovoltaic system. The photovoltaic system includes at least one DC/DC converter and an inverter. An input terminal of the at least one DC/DC converter is configured to be connected to a photovoltaic module, an output terminal is configured to be connected to an input terminal of the inverter by using a direct current bus, and an output terminal of the inverter is connected to an alternating current grid. When the inverter is switched from a power-limited working state to a non-power-limited working state, the inverter adjusts a bus voltage of the inverter to drop from a fifth voltage to a sixth voltage. After running in the non-power-limited working state for a time interval, the inverter adjusts the bus voltage to rise from the sixth voltage to a seventh voltage. The seventh voltage is greater than or equal to the fifth voltage. Therefore, through short-term adjustment of the bus voltage, it may be ensured that a difference between a bus voltage that exists before the inverter is switched from the power-limited working state to the non-power-limited working state and a bus voltage that exists after the inverter is switched from the power-limited working state to the non-power-limited working state is reduced, so that the bus voltage of the inverter does not change greatly due to a change in a working state of the inverter. In this way, stability of the inverter can be effectively improved, and therefore stability and working efficiency of the photovoltaic system are improved, and there is high applicability.

With reference to the third aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the fifth voltage is obtained by the inverter through controlling based on a sum of output voltage reference values of the at least one DC/DC converter that exist when the inverter is in the power-limited working state, and the sixth voltage is obtained by the inverter through controlling based on an input voltage reference value of the DC/AC circuit that exists when the inverter is in the power-limited working state. It may be understood that the inverter may set that when the inverter is in the power-limited working state, the input voltage reference value of the DC/AC circuit is the sixth voltage, and the sum of the output voltage reference values of the at least one DC/DC converter is the fifth voltage, the bus voltage that exists when the inverter is in the power-limited working state is a sum of output voltages of the at least one DC/DC converter, and the bus voltage that exists when the inverter is in the non-power-limited working state is an input voltage of the DC/AC circuit, so that when the working state of the inverter is switched from the power-limited working state to the non-power-limited working state due to impact of an external factor, it is ensured that the bus voltage of the inverter drops from the fifth voltage to the sixth voltage.

With reference to the third aspect, in a second possible implementation, the inverter adjusts the input voltage reference value of the DC/AC circuit to the sum of the output voltage reference values of the at least one DC/DC converter that exist when the inverter is in the power-limited working state, and adjusts the input voltage of the DC/AC circuit based on the input voltage reference value of the DC/AC circuit. The bus voltage that exists when the inverter is in the non-power-limited working state is the input voltage of the DC/AC circuit. It may be understood that in the manner in which when it is determined that the inverter is switched from the power-limited working state to the non-power-limited working state, the input voltage reference value of the DC/AC circuit is adjusted to be consistent with the sum of the output voltage reference values of the at least one DC/DC converter that exist when the inverter is in the power-limited working state, it can be ensured that a bus of the inverter rises from the sixth voltage to the fifth voltage, and therefore it is ensured that after the inverter is switched from the power-limited working state to the non-power-limited working state, the bus voltage of the inverter is always controlled to be the fifth voltage. In this way, stability of the inverter can be improved, and therefore stability of the photovoltaic system is improved, and there is high applicability.

With reference to the third aspect, in a third possible implementation, after the inverter runs in the non-power-limited working state for a time interval, the inverter further adjusts the sum of the output voltage reference values of the at least one DC/DC converter to an eighth voltage, and adjusts the sum of the output voltages of the at least one DC/DC converter based on the sum of the output voltage reference values of the at least one DC/DC converter. The eighth voltage is greater than the sum of the output voltage reference values of the at least one DC/DC converter that exist when the inverter is in the power-limited working state.

According to a fourth aspect, the embodiments may provide a photovoltaic system. The photovoltaic system includes an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid. When the inverter is switched from a power-limited working state to a non-power-limited working state, the inverter adjusts a bus voltage of the inverter to drop from a fifth voltage to a sixth voltage. After running in the non-power-limited working state for a time interval, the inverter adjusts the bus voltage to rise from the sixth voltage to a seventh voltage. The seventh voltage is greater than or equal to the fifth voltage. Therefore, through short-term adjustment of the bus voltage, it may be ensured that a difference between a bus voltage that exists before the inverter is switched from the power-limited working state to the non-power-limited working state and a bus voltage that exists after the inverter is switched from the power-limited working state to the non-power-limited working state is reduced, so that the bus voltage of the inverter does not change greatly due to a change in a working state of the inverter. In this way, stability of the inverter can be effectively improved, and therefore stability and working efficiency of the photovoltaic system are improved, and there is high applicability.

With reference to the fourth aspect, in a first possible implementation, the fifth voltage is obtained by the inverter through controlling based on an output voltage reference value of the DC/DC circuit that exists when the inverter is in the power-limited working state, and the sixth voltage is obtained by the inverter through controlling based on an input voltage reference value of the DC/AC circuit that exists when the inverter is in the power-limited working state. It may be understood that the inverter may set that when the inverter is in the power-limited working state, the input voltage reference value of the DC/AC circuit is the sixth voltage, and the output voltage reference value of the DC/DC circuit is the fifth voltage, the bus voltage that exists when the inverter is in the power-limited working state is an output voltage of the DC/DC circuit, and the bus voltage that exists when the inverter is in the non-power-limited working state is an input voltage of the DC/AC circuit, so that when the working state of the inverter is switched from the power-limited working state to the non-power-limited working state due to impact of an external factor, it is ensured that the bus voltage of the inverter drops from the fifth voltage to the sixth voltage.

With reference to the fourth aspect, in a second possible implementation, the inverter adjusts the input voltage reference value of the DC/AC circuit to the output voltage reference value of the DC/DC circuit that exists when the inverter is in the power-limited working state, and adjusts the input voltage of the DC/AC circuit based on the input voltage reference value of the DC/AC circuit. The bus voltage that exists when the inverter is in the non-power-limited working state is the input voltage of the DC/AC circuit. It may be understood that in the manner in which the input voltage reference value of the DC/AC circuit is adjusted to be consistent with the output voltage reference value of the DC/DC circuit that exists when the inverter is in the power-limited working state, it can be ensured that a bus of the inverter rises from the sixth voltage to the fifth voltage, and therefore it is ensured that after the inverter is switched from the power-limited working state to the non-power-limited working state, the bus voltage of the inverter is always controlled to be the fifth voltage. In this way, stability of the inverter can be improved, and therefore stability of the photovoltaic system is improved, and there is high applicability.

With reference to the fourth aspect, in a third possible implementation, after the inverter runs in the non-power-limited working state for a time interval, the inverter further adjusts the output voltage reference value of the DC/DC circuit to an eighth voltage and adjusts the output voltage of the DC/DC circuit based on the output voltage reference value of the DC/DC circuit. The eighth voltage is greater than the output voltage reference value of the DC/DC circuit that exists when the inverter is in the power-limited working state.

With reference to the fourth aspect, in a fourth possible implementation, the seventh voltage is greater than a peak voltage of the alternating current grid, and a second difference between the seventh voltage and the peak voltage is less than a third difference threshold. Therefore, a case in which there is an excessively large difference between the bus voltage and the peak voltage of the alternating current grid can be avoided. In this way, stability and conversion efficiency of the inverter can be effectively improved, and therefore stability and working efficiency of the photovoltaic system are improved, and there is high applicability.

With reference to the fourth aspect, in a fifth possible implementation, the second difference between the seventh voltage and the peak voltage of the alternating current grid is greater than a fourth difference threshold, and the fourth difference threshold is less than the third difference threshold. Therefore, a case in which the inverter cannot normally output a sine-wave alternating current due to an excessively small difference between the bus voltage and the peak voltage of the alternating current grid can be effectively avoided. In this way, stability of the inverter can be improved, and therefore stability of the photovoltaic system is improved.

According to a fifth aspect, the embodiments may provide an inverter. An input terminal of the inverter is connected to an output terminal of at least one DC/DC converter by using a direct current bus, and an output terminal is connected to an alternating current grid. When the inverter is switched from a non-power-limited working state to a power-limited working state, the inverter adjusts a bus voltage of the inverter to rise from a first voltage to a second voltage. When the inverter is in the non-power-limited working state, the inverter performs maximum power point tracking to maximize output power. When the inverter is in the power-limited working state, the inverter actively limits the output power. After running in the power-limited working state for a time interval, the inverter adjusts the bus voltage to drop from the second voltage to a third voltage. The third voltage is less than or equal to the first voltage.

With reference to the fifth aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the first voltage is obtained by the inverter through controlling based on an input voltage reference value of the DC/AC circuit that exists when the inverter is in the non-power-limited working state, and the second voltage is obtained by the inverter through controlling based on a sum of output voltage reference values of the at least one DC/DC converter that exist when the inverter is in the non-power-limited working state.

With reference to the fifth aspect, in a second possible implementation, the inverter adjusts the sum of the output voltage reference values of the at least one DC/DC converter to the input voltage reference value of the DC/AC circuit that exists when the inverter is in the non-power-limited working state, and adjusts a sum of output voltages of the at least one DC/DC converter based on the sum of the output voltage reference values of the at least one DC/DC converter, to ensure that the bus voltage drops from the second voltage to the first voltage. The bus voltage that exists when the inverter is in the power-limited working state is the sum of the output voltages of the at least one DC/DC converter.

According to a sixth aspect, the embodiments may provide an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid. When the inverter is switched from a non-power-limited working state to a power-limited working state, the inverter adjusts a bus voltage of the inverter to rise from a first voltage to a second voltage. When the inverter is in the non-power-limited working state, the inverter performs maximum power point tracking to maximize output power. When the inverter is in the power-limited working state, the inverter actively limits the output power. After running in the power-limited working state for a time interval, the inverter adjusts the bus voltage to drop from the second voltage to a third voltage. The third voltage is less than or equal to the first voltage.

With reference to the sixth aspect, in a first possible implementation, the first voltage is obtained by the inverter through controlling based on an input voltage reference value of the DC/AC circuit that exists when the inverter is in the non-power-limited working state, and the second voltage is obtained by the inverter through controlling based on an output voltage reference value of the DC/DC circuit that exists when the inverter is in the non-power-limited working state.

With reference to the sixth aspect, in a second possible implementation, the inverter adjusts the output voltage reference value of the DC/DC circuit to the input voltage reference value of the DC/AC circuit that exists when the inverter is in the non-power-limited working state, and adjusts an output voltage of the DC/DC circuit based on the output voltage reference value of the DC/DC circuit, to ensure that the bus voltage drops from the second voltage to the first voltage. The bus voltage that exists when the inverter is in the power-limited working state is the output voltage of the DC/DC circuit.

According to a seventh aspect, the embodiments may provide an inverter. An input terminal of the inverter is connected to an output terminal of at least one DC/DC converter by using a direct current bus, and an output terminal is connected to an alternating current grid. When the inverter is switched from a power-limited working state to a non-power-limited working state, the inverter adjusts a bus voltage of the inverter to drop from a fifth voltage to a sixth voltage. When the inverter is in the non-power-limited working state, the inverter performs maximum power point tracking to maximize output power. When the inverter is in the power-limited working state, the inverter actively limits the output power. After running in the non-power-limited working state for a time interval, the inverter adjusts the bus voltage to rise from the sixth voltage to a seventh voltage. The seventh voltage is greater than or equal to the fifth voltage.

With reference to the seventh aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the fifth voltage is obtained by the inverter through controlling based on a sum of output voltage reference values of the at least one DC/DC converter that exist when the inverter is in the power-limited working state, and the sixth voltage is obtained by the inverter through controlling based on an input voltage reference value of the DC/AC circuit that exists when the inverter is in the power-limited working state.

With reference to the seventh aspect, in a second possible implementation, the inverter adjusts the input voltage reference value of the DC/AC circuit to the sum of the output voltage reference values of the at least one DC/DC converter that exist when the inverter is in the power-limited working state, and adjusts an input voltage of the DC/AC circuit based on the input voltage reference value of the DC/AC circuit, to ensure that the bus voltage rises from the sixth voltage to the fifth voltage. The bus voltage that exists when the inverter is in the non-power-limited working state is the input voltage of the DC/AC circuit.

According to an eighth aspect, the embodiments may provide an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid. When the inverter is switched from a power-limited working state to a non-power-limited working state, the inverter adjusts a bus voltage of the inverter to drop from a fifth voltage to a sixth voltage. When the inverter is in the non-power-limited working state, the inverter performs maximum power point tracking to maximize output power. When the inverter is in the power-limited working state, the inverter actively limits the output power. After running in the non-power-limited working state for a time interval, the inverter adjusts the bus voltage to rise from the sixth voltage to a seventh voltage. The seventh voltage is greater than or equal to the fifth voltage.

With reference to the eighth aspect, in a first possible implementation, the fifth voltage is obtained by the inverter through controlling based on an output voltage reference value of the DC/DC circuit that exists when the inverter is in the power-limited working state, and the sixth voltage is obtained by the inverter through controlling based on an input voltage reference value of the DC/AC circuit that exists when the inverter is in the power-limited working state.

With reference to the eighth aspect, in a second possible implementation, the inverter adjusts the input voltage reference value of the DC/AC circuit to the output voltage reference value of the DC/DC circuit that exists when the inverter is in the power-limited working state, and adjusts an input voltage of the DC/AC circuit based on the input voltage reference value of the DC/AC circuit, to ensure that the bus voltage rises from the sixth voltage to the fifth voltage. The bus voltage that exists when the inverter is in the non-power-limited working state is the input voltage of the DC/AC circuit.

According to a ninth aspect, the embodiments may provide a bus voltage control method for an inverter. An input terminal of the inverter is connected to an output terminal of at least one DC/DC converter by using a direct current bus, and an output terminal is connected to an alternating current grid. The method includes: when the inverter is switched from a non-power-limited working state to a power-limited working state, adjusting a bus voltage of the inverter to rise from a first voltage to a second voltage, where when the inverter is in the non-power-limited working state, the inverter performs maximum power point tracking to maximize output power, and when the inverter is in the power-limited working state, the inverter actively limits the output power; and after the inverter is in the power-limited working state for a time interval, adjusting the bus voltage to drop from the second voltage to a third voltage, where the third voltage is less than or equal to the first voltage.

With reference to the ninth aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the first voltage is obtained by the inverter through controlling based on an input voltage reference value of the DC/AC circuit that exists when the inverter is in the non-power-limited working state, and the second voltage is obtained by the inverter through controlling based on a sum of output voltage reference values of the at least one DC/DC converter that exist when the inverter is in the non-power-limited working state.

With reference to the ninth aspect, in a second possible implementation, the sum of the output voltage reference values of the at least one DC/DC converter is adjusted to the input voltage reference value of the DC/AC circuit that exists when the inverter is in the non-power-limited working state, and a sum of output voltages of the at least one DC/DC converter is adjusted based on the sum of the output voltage reference values of the at least one DC/DC converter, to ensure that the bus voltage drops from the second voltage to the first voltage. The bus voltage that exists when the inverter is in the power-limited working state is the sum of the output voltages of the at least one DC/DC converter.

According to a tenth aspect, the embodiments may provide a bus voltage control method for an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid. The method includes: when the inverter is switched from a non-power-limited working state to a power-limited working state, adjusting a bus voltage of the inverter to rise from a first voltage to a second voltage, where when the inverter is in the non-power-limited working state, the inverter performs maximum power point tracking to maximize output power, and when the inverter is in the power-limited working state, the inverter actively limits the output power; and after the inverter is in the power-limited working state for a time interval, adjusting the bus voltage to drop from the second voltage to a third voltage, where the third voltage is less than or equal to the first voltage.

With reference to the tenth aspect, in a first possible implementation, the first voltage is obtained by the inverter through controlling based on an input voltage reference value of the DC/AC circuit that exists when the inverter is in the non-power-limited working state, and the second voltage is obtained by the inverter through controlling based on an output voltage reference value of the DC/DC circuit that exists when the inverter is in the non-power-limited working state.

With reference to the tenth aspect, in a second possible implementation, the output voltage reference value of the DC/DC circuit is adjusted to the input voltage reference value of the DC/AC circuit that exists when the inverter is in the non-power-limited working state, and an output voltage of the DC/DC circuit is adjusted based on the output voltage reference value of the DC/DC circuit, to ensure that the bus voltage drops from the second voltage to the first voltage. The bus voltage that exists when the inverter is in the power-limited working state is the output voltage of the DC/DC circuit.

According to an eleventh aspect, the embodiments may provide a bus voltage control method for an inverter. An input terminal of the inverter is connected to an output terminal of at least one DC/DC converter by using a direct current bus, and an output terminal is connected to an alternating current grid. The method includes: when the inverter is switched from a power-limited working state to a non-power-limited working state, adjusting a bus voltage of the inverter to drop from a fifth voltage to a sixth voltage, where when the inverter is in the non-power-limited working state, the inverter performs maximum power point tracking to maximize output power, and when the inverter is in the power-limited working state, the inverter actively limits the output power; and after the inverter is in the non-power-limited working state for a time interval, adjusting the bus voltage to rise from the sixth voltage to a seventh voltage, where the seventh voltage is greater than or equal to the fifth voltage.

With reference to the eleventh aspect, in a first possible implementation, output terminals of the at least one DC/DC converter are connected in series and then connected to the input terminal of the inverter by using the direct current bus, the inverter includes a DC/AC circuit, and an input terminal of the DC/AC circuit is connected to the input terminal of the inverter; and the fifth voltage is obtained by the inverter through controlling based on a sum of output voltage reference values of the at least one DC/DC converter that exist when the inverter is in the power-limited working state, and the sixth voltage is obtained by the inverter through controlling based on an input voltage reference value of the DC/AC circuit that exists when the inverter is in the power-limited working state.

With reference to the eleventh aspect, in a second possible implementation, the input voltage reference value of the DC/AC circuit is adjusted to the sum of the output voltage reference values of the at least one DC/DC converter that exist when the inverter is in the power-limited working state, and an input voltage of the DC/AC circuit is adjusted based on the input voltage reference value of the DC/AC circuit, to ensure that the bus voltage rises from the sixth voltage to the fifth voltage. The bus voltage that exists when the inverter is in the non-power-limited working state is the input voltage of the DC/AC circuit.

According to a twelfth aspect, the embodiments may provide a bus voltage control method for an inverter. The inverter includes a DC/DC circuit and a DC/AC circuit. An input terminal of the inverter is configured to be connected to a photovoltaic module, an output terminal of the DC/DC circuit is connected to an input terminal of the DC/AC circuit by using a direct current bus, and an output terminal of the inverter is connected to an alternating current grid.

The method includes: when the inverter is switched from a power-limited working state to a non-power-limited working state, adjusting a bus voltage of the inverter to drop from a fifth voltage to a sixth voltage, where when the inverter is in the non-power-limited working state, the inverter performs maximum power point tracking to maximize output power, and when the inverter is in the power-limited working state, the inverter actively limits the output power; and after the inverter is in the non-power-limited working state for a time interval, adjusting the bus voltage to rise from the sixth voltage to a seventh voltage, where the seventh voltage is greater than or equal to the fifth voltage.

With reference to the twelfth aspect, in a first possible implementation, the fifth voltage is obtained by the inverter through controlling based on an output voltage reference value of the DC/DC circuit that exists when the inverter is in the power-limited working state, and the sixth voltage is obtained by the inverter through controlling based on an input voltage reference value of the DC/AC circuit that exists when the inverter is in the power-limited working state.

With reference to the twelfth aspect, in a second possible implementation, the input voltage reference value of the DC/AC circuit is adjusted to the output voltage reference value of the DC/DC circuit that exists when the inverter is in the power-limited working state, and an input voltage of the DC/AC circuit is adjusted based on the input voltage reference value of the DC/AC circuit, to ensure that the bus voltage rises from the sixth voltage to the fifth voltage. The bus voltage that exists when the inverter is in the non-power-limited working state is the input voltage of the DC/AC circuit.

It should be understood that mutual reference may be made to implementation and beneficial effects of the plurality of aspects.

DETAILED DESCRIPTION OF THE EMBODIMENTS

A photovoltaic system may be applied to different application scenarios, for example, a photovoltaic power supply scenario and a photovoltaic and storage hybrid power supply scenario. In the photovoltaic power supply scenario, a power supply is a photovoltaic module. In the photovoltaic and storage hybrid power supply scenario, a power supply includes a photovoltaic module and an energy storage battery string. Description is provided below by using the photovoltaic power supply scenario as an example.

Figure 1:
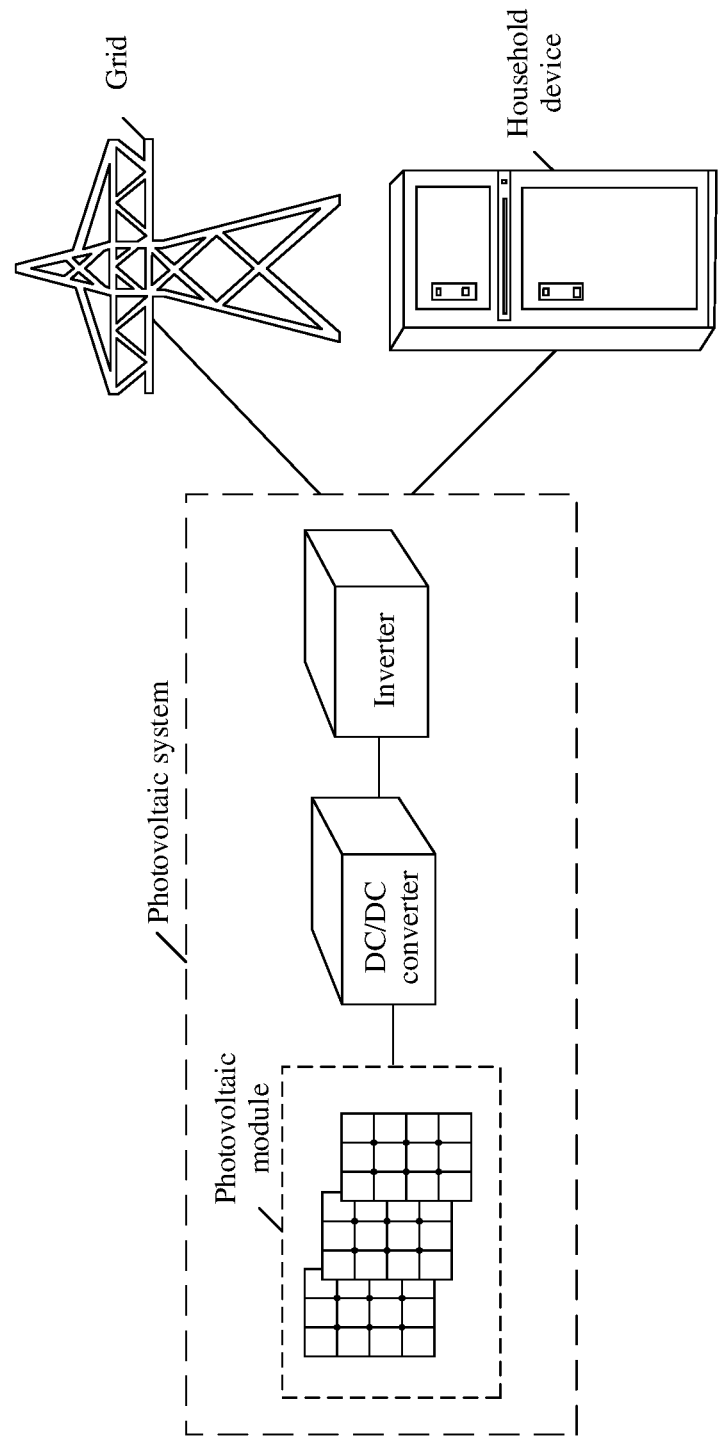
FIG. 1 is a schematic diagram of an application scenario of a photovoltaic system.

FIG. 1 is a schematic diagram of an application scenario of a photovoltaic system. In a photovoltaic power supply scenario, the photovoltaic system may include a photovoltaic module, a DC/DC converter, and an inverter. The photovoltaic module is connected to an input terminal of the DC/DC converter, an output terminal of the DC/DC converter is connected to an input terminal of the inverter, and an output terminal of the inverter is connected to an alternating current grid or a household device. Optionally, there may be a plurality of photovoltaic modules connected to the input terminal of the DC/DC converter. The plurality of photovoltaic modules may be connected in series and/or in parallel and then connected to the DC/DC converter. After the photovoltaic system starts to run, the DC/DC converter may convert a direct current generated by the photovoltaic module connected to the input terminal of the DC/DC converter into a direct current with a preset voltage through direct current-to-direct current conversion, and output the direct current to the inverter, and the inverter converts the direct current output by the DC/DC converter into an alternating current, to supply power to various types of electrical devices such as an alternating current grid or an alternating current load (for example, a household device). The inverter in the photovoltaic system may perform short-term adjustment on a bus voltage, and therefore it is ensured that the bus voltage of the inverter can be quickly restored after switching between a non-power-limited working state and a power-limited working state is performed, so that the bus voltage is not affected by a change in a working state of the inverter 11. In this way, stability of the inverter is improved, and therefore stability of the photovoltaic system is improved, and there is high applicability.

The foregoing description is merely an example of the application scenario of the photovoltaic system and is not exhaustive. The application scenario is not limited.

Working principles of the photovoltaic system and an inverter are described below by using examples and with reference to FIG. 2 to FIG. 9.

Figure 2:
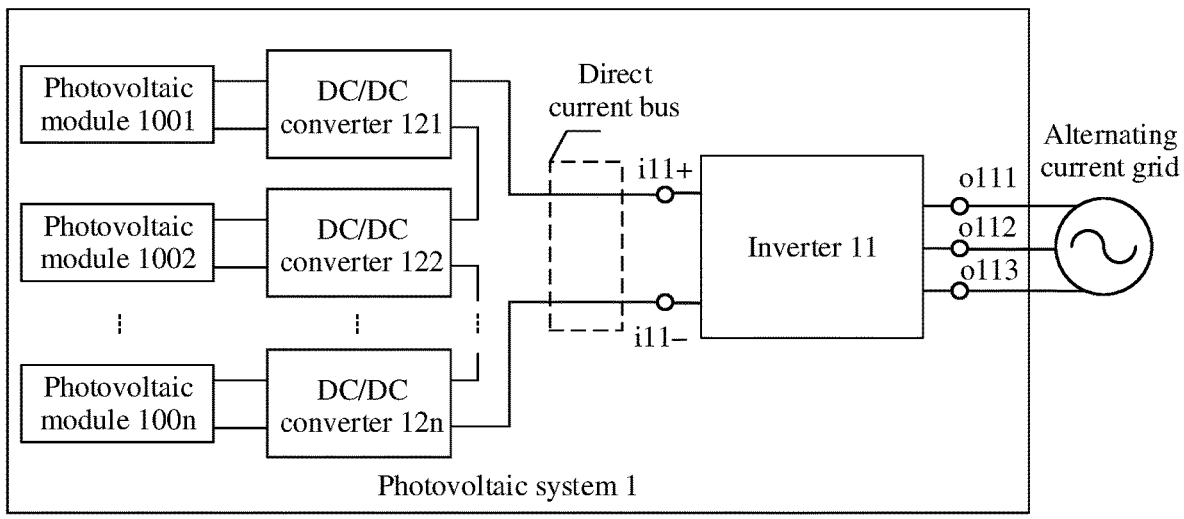
FIG. 2 is a schematic diagram of a structure of a photovoltaic system.

FIG. 2 is a schematic diagram of a structure of a photovoltaic system. As shown in FIG. 2, the photovoltaic system 1 includes a DC/DC converter 121, . . . , and a DC/DC converter 12n, and an inverter 11, where n is a positive integer. An input terminal of the DC/DC converter 121 is connected to a photovoltaic module 100l, . . . , and an input terminal of the DC/DC converter 12n is connected to a photovoltaic module 100n. Two terminals formed after an output terminal of the DC/DC converter 121, . . . , and an output terminal of the DC/DC converter 12n are connected in series are connected to input terminals i11+ and i11− of the inverter 11 by using a direct current bus. Output terminals o111, o112, and o113 of the inverter 11 are connected to an alternating current grid.

Figure 3:
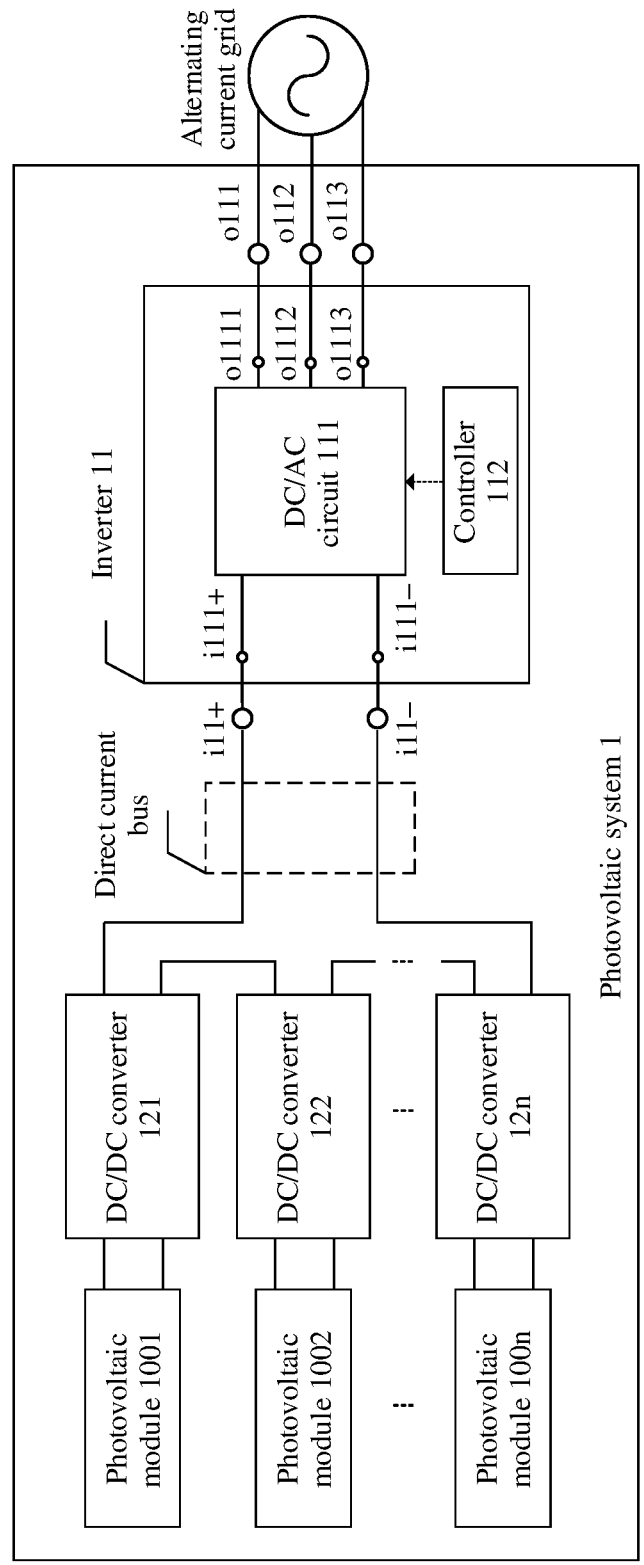
FIG. 3 is another schematic diagram of a structure of a photovoltaic system.

Further, for ease of description, FIG. 3 is another schematic diagram of a structure of a photovoltaic system. As shown in FIG. 3, the inverter 11 includes a DC/AC circuit 111 and a controller 112. Input terminals i111+ and i111− of the DC/AC circuit 111 are respectively connected to the input terminals i11+ and i11− of the inverter 11. Output terminals o1111, o1112, and o1113 of the DC/AC circuit 111 are respectively connected to the output terminals o111, o112, and o113 of the inverter 11.

In an optional implementation, when the inverter 11 is switched from a non-power-limited working state to a power-limited working state, a bus voltage (namely, a voltage of the direct current bus) of the inverter 11 is adjusted to rise from a first voltage to a second voltage. After the inverter 11 is in the power-limited working state for a time interval, the bus voltage of the inverter 11 is adjusted to drop from the second voltage to a third voltage. The third voltage is less than or equal to the first voltage. When the inverter 11 is in the non-power-limited working state, the inverter 11 performs maximum power point tracking (Maximum Power Point Tracking, MPPT) to maximize output power. When the inverter 11 is in the power-limited working state, the inverter 11 actively limits the output power.

In an optional embodiment, after the photovoltaic system 1 starts to work, the inverter 11 performs MPPT to maximize the output power of the inverter 11. In this case, the inverter 11 is in the non-power-limited working state. The controller 112 controls a sum of output voltages of the n DC/DC converters based on a sum of output voltage reference values of the n DC/DC converters that exist when the inverter 11 is in the non-power-limited working state, in other words, a control objective is to enable the sum of the output voltages of the n DC/DC converters to reach the sum of the output voltage reference values of the n DC/DC converters. The sum of the output voltage reference values of the n DC/DC converters that exist when the inverter 11 is in the non-power-limited working state is the second voltage. In addition, the controller 112 controls an input voltage of the DC/AC circuit 111 based on an input voltage reference value of the DC/AC circuit 111 that exists when the inverter 11 is in the non-power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the non-power-limited working state is the first voltage. When the inverter 11 is in the non-power-limited working state, the bus voltage is the input voltage of the DC/AC circuit 111, in other words, when the inverter 11 is in the non-power-limited working state, the bus voltage is the first voltage. The first voltage is that $V1=Vg*1.4142+45$, and the second voltage is that $V2=Vg*1.4142+75$, where Vg is an effective voltage value of the alternating current grid. When the alternating current grid is a single-phase grid, $Vg=230$ Vac, $V1 \approx 370$ V, and $V2 \approx 400$ V. When the alternating current grid is a three-phase grid, $Vg=400$ Vac, $V1 \approx 611$ V, and $V2 \approx 641$ V. Description is provided below by using an example in which the alternating current grid is a single-phase grid.

It should be noted that in a working process of the inverter 11, the inverter 11 is in different working states due to impact of an external factor (including a change in external light or information indicating whether a power limiting instruction is received), and as a working state of the inverter 11 changes, the bus voltage changes between the sum of the output voltages of the n DC/DC converters and the input voltage of the DC/AC circuit 111. The working state of the inverter 11 includes the power-limited working state and the non-power-limited working state. When the inverter 11 is in the power-limited working state, the inverter 11 actively limits the output power. For example, photovoltaic power is greater than maximum output power of the inverter 11, or the inverter 11 accepts power scheduling to limit the output power. For example, when the inverter 11 is in the non-power-limited working state because the photovoltaic module outputs insufficient power due to a cloudy weather condition, the bus voltage of the inverter 11 is the input voltage of the DC/AC circuit 111; or when the inverter 11 is in the power-limited working state because power output by the photovoltaic module is increased due to sufficient sunlight, the bus voltage of the inverter 11 is the sum of the output voltages of the n DC/DC converters.

Then, the inverter 11 is switched from the non-power-limited working state to the power-limited working state due to impact of an external factor. For example, after receiving a power limiting instruction, the controller 112 actively limits the output power of the inverter 11 based on the power limiting instruction. Therefore, the inverter 11 is switched from the non-power-limited working state to the power-limited working state. When the inverter 11 is in the non-power-limited working state, the bus voltage of the inverter 11 is the input voltage (namely, the first voltage 370 V) of the DC/AC circuit 111, and when the inverter 11 is in the power-limited working state, the bus voltage of the inverter 11 is the sum (namely, the second voltage 400 V) of the output voltages of the n DC/DC converters. Therefore, when the inverter 11 is switched from the non-power-limited working state to the power-limited working state, the bus voltage of the inverter 11 rises from the first voltage 370 V to the second voltage 400 V.

Then, after the inverter 11 runs in the power-limited working state for a time interval, the controller 112 adjusts the bus voltage of the inverter 11 to drop from the second voltage to the third voltage. The third voltage is less than or equal to the first voltage. Duration corresponding to the time interval in which the inverter 11 runs in the power-limited working state may approximately range from hundreds of milliseconds to several seconds.

In an optional embodiment, the controller 112 adjusts the sum of the output voltage reference values of the n DC/DC converters to the input voltage reference value (namely, the first voltage 370 V) of the DC/AC circuit 111 that exists when the inverter 11 is in the non-power-limited working state, and sends voltage adjustment instructions to all of the n DC/DC converters. All the DC/DC converters adjust respective output voltages based on output voltage reference values carried in the respectively received voltage adjustment instructions, in other words, a control objective is to enable the sum of the output voltages of the n DC/DC converters to reach 370 V. The sum of the output voltage reference values of the n DC/DC converters is the sum of the output voltage reference values of the n DC/DC converters. When the inverter 11 is in the power-limited working state, the bus voltage is the sum of the output voltages of the n DC/DC converters. Therefore, the sum of the output voltages of the n DC/DC converters may be adjusted to drop the bus voltage of the inverter 11 from the second voltage 400 V to the third voltage 370 V. It may be understood that through short-term control of the bus voltage of the inverter 11, it is ensured that a bus voltage that exists before the inverter 11 is switched between the power-limited working state and the non-power-limited working state and a bus voltage that exists after the inverter 11 is switched between the power-limited working state and the non-power-limited working state are maintained as a same voltage, so that the bus voltage is not affected by a change in the working state of the inverter 11. In this way, stability of the inverter 11 is improved, and therefore stability of the photovoltaic system 1 is improved, and there is high applicability.

In another optional embodiment, the controller 112 adjusts the sum of the output voltage reference values of the n DC/DC converters to the third voltage, where the third voltage is less than the first voltage 370 V, for example, 365 V, and sends voltage adjustment instructions to all of the n DC/DC converters. All the DC/DC converters adjust respective output voltages based on output voltage reference values carried in the respectively received voltage adjustment instructions, in other words, a control objective is to enable the sum of the output voltages of the n DC/DC converters to reach 365 V. The sum of the output voltage reference values of the n DC/DC converters is the sum of the output voltage reference values of the n DC/DC converters. When the inverter 11 is in the power-limited working state, the bus voltage is the sum of the output voltages of the n DC/DC converters. Therefore, the sum of the output voltages of the n DC/DC converters may be adjusted to drop the bus voltage of the inverter 11 from the second voltage 400 V to the third voltage 365 V. It should be noted that in actual application, to avoid a case in which a sine-wave alternating current cannot be normally output due to an excessively low bus voltage of the inverter 11, the third voltage may be greater than 340 V. It may be understood that through short-term control of the bus voltage of the inverter 11, it is ensured that a difference between a bus voltage that exists before the inverter 11 is switched between the power-limited working state and the non-power-limited working state and a bus voltage that exists after the inverter 11 is switched between the power-limited working state and the non-power-limited working state is reduced, so that the bus voltage is not affected by a change in the working state of the inverter 11. In this way, stability of the inverter 11 is improved, and therefore stability of the photovoltaic system 1 is improved. Further, when the bus voltage is slightly greater than a peak voltage of the alternating current grid, the inverter 11 may have the highest conversion efficiency. Therefore, the conversion efficiency of the inverter 11 can be improved, a loss of the inverter 11 can be reduced, and there is higher applicability.

In addition, after the inverter 11 runs in the power-limited working state for a time interval, the controller 112 further adjusts the input voltage reference value of the DC/AC circuit 111 to a fourth voltage $V4=Vg*1.4142+15\approx340$ V, and adjusts the input voltage of the DC/AC circuit based on the input voltage reference value of the DC/AC circuit 111 by controlling a working state (on or off) of each switching transistor in the DC/AC circuit 111, in other words, a control objective is to enable the input voltage of the DC/AC circuit 111 to reach 340 V. The fourth voltage V4 is less than the input voltage reference value (namely, the first voltage V1) of the DC/AC circuit 111 that exists when the inverter 11 is in the non-power-limited working state.

It should be noted that the third voltage is greater than the peak voltage of the alternating current grid, and a first difference between the third voltage and the peak voltage of the alternating current grid is less than a first difference threshold. It may be understood that when the bus voltage is slightly greater than the peak voltage of the alternating current grid, the inverter may have the highest conversion efficiency, and a larger difference between the bus voltage and the peak voltage of the alternating current grid may indicate a lower conversion efficiency of the inverter. After the inverter 11 is switched from the non-power-limited working state to the power-limited working state, the bus voltage may be controlled to be the third voltage through short-term adjustment. The third voltage is less than or equal to the first voltage V1, and therefore the difference between the bus voltage and the peak voltage of the alternating current grid can be effectively reduced when the inverter 11 is in the power-limited working state, and therefore the conversion efficiency can be effectively improved when the inverter 11 is in the power-limited working state.

Further, the first difference between the third voltage and the peak voltage of the alternating current grid is further greater than a second difference threshold, and the second difference threshold is less than the first difference threshold. Herein, a value of the first difference threshold is any value provided that a requirement that the conversion efficiency of the inverter 11 can be improved is met, and a value of the second difference threshold is any value provided that a requirement that the inverter 11 can work normally is met. It may be understood that after the inverter 11 is switched from the non-power-limited working state to the power-limited working state, the bus voltage is always controlled to be the third voltage, and the first difference between the third voltage and the peak voltage of the alternating current grid is greater than the second difference threshold. Therefore, a case in which the inverter 11 cannot normally output a sine-wave alternating current to the alternating current grid because when there is an excessively small first difference, the inverter 11 is likely to be affected by a fluctuation of the alternating current grid can be avoided. In this way, stability of the inverter 11 can be improved, and therefore stability of the photovoltaic system 1 is improved.

Figure 4:
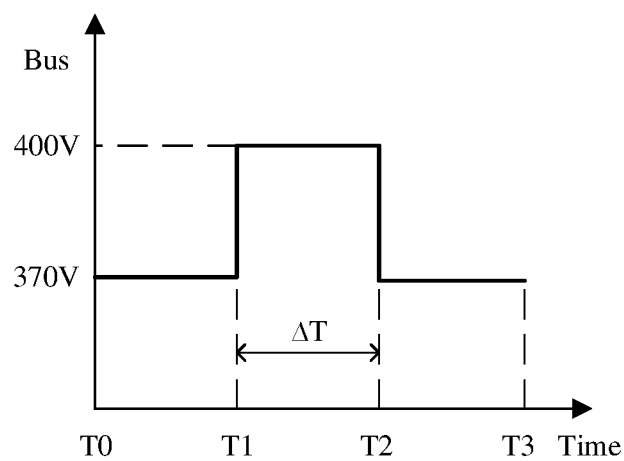
FIG. 4 is a schematic diagram of a bus voltage in a process in which an inverter is switched from a non-power-limited working state to a power-limited working state.

For ease of understanding, FIG. 4 is a schematic diagram of a bus voltage in a process in which an inverter is switched from a non-power-limited working state to a power-limited working state. As shown in FIG. 4, BUS is the bus voltage. When T0≤Time<T1, the inverter 11 is in the non-power-limited working state. The controller 112 sets the sum of the output voltage reference values of the n DC/DC converters to the second voltage 400 V, and sets the input voltage reference value of the DC/AC circuit 111 to the first voltage 370 V. In addition, the controller 112 controls the sum of the output voltages of the n DC/DC converters based on the sum of the output voltage reference values of the n DC/DC converters, in other words, a control objective is to enable the sum of the output voltages of the n DC/DC converters to reach 400 V, and controls the input voltage of the DC/AC circuit 111 based on the input voltage reference value of the DC/AC circuit 111, in other words, a control objective is to enable the input voltage of the DC/AC circuit 111 to reach 370 V. When T0≤Time<T1, the inverter 11 is in the non-power-limited working state. Therefore, the bus voltage in this time period is the input voltage 370 V of the DC/AC circuit 111.

When Time=T1, the inverter 11 is in the power-limited working state due to an external factor (for example, a received power limiting instruction). The output power of the inverter 11 is less than input power of the inverter 11, and therefore the bus voltage starts to rise from 370 V to 400 V.

When T1<Time<T2, the inverter 11 is in the power-limited working state. Therefore, the bus voltage in this time period is the sum 400 V of the output voltages of the n DC/DC converters. Herein, a time interval ΔT corresponding to the case in which T1<Time<T2 is the duration corresponding to the time interval in which the inverter 11 runs in the power-limited working state, and may approximately range from hundreds of milliseconds to several seconds, and the time interval may be less than a time interval threshold.

When Time=T2, the controller 112 adjusts the sum of the output voltage reference values of the n DC/DC converters from the second voltage 400 V to the third voltage 370 V, and adjusts the input voltage reference value of the DC/AC circuit 111 from the first voltage 370 V to the fourth voltage 340 V; and adjusts the sum of the output voltages of the n DC/DC converters based on the sum of the output voltage reference values of the n DC/DC converters, in other words, a control objective is to enable the sum of the output voltages of the n DC/DC converters to reach 370 V, and adjusts the input voltage of the DC/AC circuit 111 based on the input voltage reference value of the DC/AC circuit 111, in other words, a control objective is to enable the input voltage of the DC/AC circuit 111 to reach 340 V. The inverter 11 is in the power-limited working state at the moment T2. Therefore, an adjusted bus voltage at this moment is the sum 370 V of the output voltages of the n DC/DC converters.

When T2<Time≤T3, the inverter 11 is in the power-limited working state. Therefore, the bus voltage in this time period is the sum 370 V of the output voltages of the n DC/DC converters.

In this embodiment, the inverter 11 may perform short-term adjustment on the bus voltage, and therefore it is ensured that a difference between a bus voltage that exists before the inverter 11 is switched from the non-power-limited working state to the power-limited working state and a bus voltage that exists after the inverter 11 is switched from the non-power-limited working state to the power-limited working state is reduced, so that the bus voltage of the inverter 11 does not change greatly due to a change in the working state of the inverter 11. In this way, stability of the inverter 11 can be effectively improved, and therefore stability and working efficiency of the photovoltaic system 1 are improved. In addition, the bus voltage is controlled to be the third voltage, and the third voltage includes a minimum voltage that meets a grid connection requirement (namely, a requirement that the bus voltage may be greater than the peak voltage of the alternating current grid). Therefore, the conversion efficiency of the inverter 11 can be improved, and voltage stress of a switching device in the inverter 11 and a bus capacitor (capacitor located between direct current buses) can be reduced. In this way, the loss of the inverter 11 and thermal stress of the internal switching device are reduced, and therefore a service life and reliability of the inverter 11 are further improved, and therefore a service life and reliability of the photovoltaic system 1 are further improved, and there is high applicability.

In another optional implementation, when the inverter 11 is switched from a power-limited working state to a non-power-limited working state, the inverter 11 adjusts a bus voltage of the inverter 11 to drop from a fifth voltage to a sixth voltage. After the inverter 11 is in the non-power-limited working state for a time interval, the bus voltage of the inverter 11 is adjusted to rise from the sixth voltage to a seventh voltage. The seventh voltage is greater than or equal to the fifth voltage. When the inverter 11 is in the non-power-limited working state, the inverter 11 performs MPPT to maximize output power. When the inverter 11 is in the power-limited working state, the inverter 11 actively limits the output power.

In an optional embodiment, after the photovoltaic system 1 starts to work, the inverter 11 is in the power-limited working state based on a received power limiting instruction. The controller 112 controls a sum of output voltages of the n DC/DC converters based on a sum of output voltage reference values of the n DC/DC converters that exist when the inverter 11 is in the power-limited working state, in other words, a control objective is to enable the sum of the output voltages of the n DC/DC converters to reach the sum of the output voltage reference values of the n DC/DC converters. The sum of the output voltage reference values of the n DC/DC converters that exist when the inverter 11 is in the power-limited working state is the fifth voltage. In addition, the controller 112 controls an input voltage of the DC/AC circuit 111 based on an input voltage reference value of the DC/AC circuit 111 that exists when the inverter 11 is in the power-limited working state, in other words, a control objective is to enable the input voltage of the DC/AC circuit 111 to reach the input voltage reference value of the DC/AC circuit 111. The input voltage reference value of the DC/AC circuit 111 is the sixth voltage. When the inverter 11 is in the power-limited working state, the bus voltage is the sum of the output voltages of the n DC/DC converters, in other words, when the inverter 11 is in the power-limited working state, the bus voltage is the fifth voltage. The fifth voltage is that V5=Vg*1.4142+45, and the sixth voltage is that V6=Vg*1.4142+15, where Vg is an effective voltage value of the alternating current grid. When the alternating current grid is a single-phase grid, Vg=230 Vac, V5≈370 V, and V6≈340 V. When the alternating current grid is a three-phase grid, Vg=400 Vac, V5≈611 V, and V6≈581 V. Description is provided below by using an example in which the alternating current grid is a single-phase grid.

It should be noted that in a working process of the inverter 11, the inverter 11 is in different working states due to impact of an external factor (including a change in external light or information indicating whether a power limiting instruction is received), and as a working state of the inverter 11 changes, the bus voltage changes between the sum of the output voltages of the n DC/DC converters and the input voltage of the DC/AC circuit 111.

Then, the inverter 11 is switched from the power-limited working state to the non-power-limited working state due to impact of an external factor. For example, the inverter 11 is in the non-power-limited working state because the photovoltaic module outputs insufficient power due to a cloudy weather condition. Therefore, the inverter 11 is switched from the power-limited working state to the non-power-limited working state. When the inverter 11 is in the power-limited working state, the bus voltage of the inverter 11 is the sum (namely, the fifth voltage 370 V) of the output voltages of the n DC/DC converters, and when the inverter 11 is in the non-power-limited working state, the bus voltage of the inverter 11 is the input voltage (namely, the sixth voltage 340 V) of the DC/AC circuit 111. Therefore, when the inverter 11 is switched from the power-limited working state to the non-power-limited working state, the bus voltage of the inverter 11 drops from the fifth voltage 370 V to the sixth voltage 340 V.

Then, after the inverter 11 runs in the non-power-limited working state for a time interval, the controller 13 adjusts the bus voltage of the inverter 11 to rise from the sixth voltage to the seventh voltage. The seventh voltage is greater than or equal to the fifth voltage. Duration corresponding to the time interval in which the inverter 11 runs in the non-power-limited working state may approximately range from hundreds of milliseconds to several seconds.

In an optional embodiment, the controller 112 adjusts the input voltage reference value of the DC/AC circuit 111 to the sum (namely, the fifth voltage 370 V) of the output voltage reference values of the n DC/DC converters that exist when the inverter 11 is in the power-limited working state, and adjusts the input voltage of the DC/AC circuit 111 based on the input voltage reference value of the DC/AC circuit 111 by controlling a working state (on or off) of each switching transistor in the DC/AC circuit 111, in other words, a control objective is to enable the input voltage of the DC/AC circuit 111 to reach 370 V. When the inverter 11 is in the non-power-limited working state, the bus voltage is the input voltage of the DC/AC circuit 111. Therefore, the input voltage of the DC/AC circuit 111 may be adjusted to rise the bus voltage of the inverter 11 from the sixth voltage 340 V to the seventh voltage 370 V. It may be understood that through short-term control of the bus voltage of the inverter 11, it is ensured that a bus voltage that exists before the inverter 11 is switched between the power-limited working state and the non-power-limited working state and a bus voltage that exists after the inverter 11 is switched between the power-limited working state and the non-power-limited working state are maintained as a same voltage, so that the bus voltage is not affected by a change in the working state of the inverter 11. In this way, stability of the inverter 11 is improved, and therefore stability of the photovoltaic system 1 is improved, and there is high applicability.

In another optional embodiment, the controller 112 adjusts the input voltage reference value of the DC/AC circuit 111 to the seventh voltage, where the seventh voltage is greater than the fifth voltage 370 V, for example, 375 V, and adjusts the input voltage of the DC/AC circuit 111 based on the input voltage reference value of the DC/AC circuit 111 by controlling a working state (on or off) of each switching transistor in the DC/AC circuit 111, in other words, a control objective is to enable the input voltage of the DC/AC circuit 111 to reach 375 V. When the inverter 11 is in the non-power-limited working state, the bus voltage is the input voltage of the DC/AC circuit 111. Therefore, the input voltage of the DC/AC circuit 111 may be adjusted to rise the bus voltage of the inverter 11 from the sixth voltage 340 V to the seventh voltage 375 V. It should be noted that in actual application, to avoid a case in which the inverter 11 has excessively low conversion efficiency due to an excessively large difference between the bus voltage of the inverter 11 and a peak voltage of the alternating current grid, the seventh voltage may be greater than the peak voltage of the alternating current grid, and a second difference between the seventh voltage and the peak voltage of the alternating current grid may be less than a third difference threshold. It may be understood that through short-term control of the bus voltage of the inverter 11, it is ensured that a difference between a bus voltage that exists before the inverter 11 is switched between the power-limited working state and the non-power-limited working state and a bus voltage that exists after the inverter 11 is switched between the power-limited working state and the non-power-limited working state is reduced, so that the bus voltage is not affected by a change in the working state of the inverter 11. In this way, stability of the inverter 11 is improved, and therefore stability of the photovoltaic system 1 is improved.

In addition, after the inverter 11 runs in the non-power-limited working state for a time interval, the controller 112 further adjusts the sum of the output voltage reference values of the n DC/DC converters to an eighth voltage V8=Vg*1.4142+75~400 V, and controls, by sending voltage adjustment instructions to all the DC/DC converters, the sum of the output voltages of the n DC/DC converters to reach the sum 400 V of the output voltage reference values of the n DC/DC converters. The eighth voltage V8 is greater than the sum (namely, the fifth voltage V5) of the output voltage reference values of the n DC/DC converters that exist when the inverter 11 is in the power-limited working state.

It should be noted that the second difference between the seventh voltage and the peak voltage of the alternating current grid is further greater than a fourth difference threshold, and the fourth difference threshold is less than the third difference threshold. Therefore, a case in which the inverter 11 cannot normally output a sine-wave alternating current to the alternating current grid because when there is an excessively small second difference, the inverter 11 is likely to be affected by a fluctuation of the alternating current grid can be avoided. In this way, stability of the inverter 11 can be improved, and therefore stability of the photovoltaic system 1 is improved.

Figure 5:
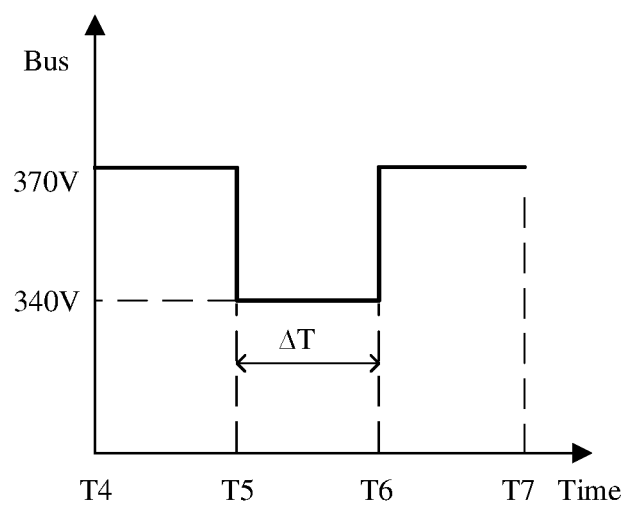
FIG. 5 is a schematic diagram of a bus voltage in a process in which an inverter is switched from a power-limited working state to a non-power-limited working state.

For ease of understanding, FIG. 5 is a schematic diagram of a bus voltage in a process in which an inverter is switched from a power-limited working state to a non-power-limited working state. As shown in FIG. 5, BUS is the bus voltage. When T4≤Time<T5, the inverter 11 is in the power-limited working state. The controller 112 sets the sum of the output voltage reference values of the n DC/DC converters to the fifth voltage 370 V, and sets the input voltage reference value of the DC/AC circuit 111 to the sixth voltage 340 V. In addition, the controller 112 controls the sum of the output voltages of the n DC/DC converters based on the sum of the output voltage reference values of the n DC/DC converters, in other words, a control objective is to enable the sum of the output voltages of the n DC/DC converters to reach 370 V, and controls the input voltage of the DC/AC circuit 111 based on the input voltage reference value of the DC/AC circuit 111, in other words, a control objective is to enable the input voltage of the DC/AC circuit 111 to reach 340 V. When T4≤Time<T5, the inverter 11 is in the power-limited working state. Therefore, the bus voltage in this time period is the sum 370 V of the output voltages of the n DC/DC converters.

When Time=T5, the inverter 11 is in the non-power-limited working state due to an external factor (for example, higher sunlight intensity). When the inverter 11 is in the non-power-limited working state, the bus voltage is the input voltage of the DC/AC circuit 111, and therefore the bus voltage starts to drop from 370 V to 340 V.

When T5<Time<T6, the inverter 11 is in the non-power-limited working state. Therefore, the bus voltage in this time period is the input voltage 340 V of the DC/AC circuit 111. Herein, a time interval \T corresponding to the case in which T5<Time<T6 is the duration corresponding to the time interval in which the inverter 11 runs in the non-power-limited working state, and may approximately range from hundreds of milliseconds to several seconds, and the time interval is less than a time interval threshold.

When Time=T6, the controller 112 adjusts the sum of the output voltage reference values of the n DC/DC converters from the fifth voltage 370 V to the eighth voltage 400 V, and adjusts the input voltage reference value of the DC/AC circuit 111 from the sixth voltage 340 V to the seventh voltage 370 V; and adjusts the sum of the output voltages of the n DC/DC converters based on the sum of the output voltage reference values of the n DC/DC converters, in other words, a control objective is to enable the sum of the output voltages of the n DC/DC converters to reach 400 V, and adjusts the input voltage of the DC/AC circuit 111 based on the input voltage reference value of the DC/AC circuit 111, in other words, a control objective is to enable the input voltage of the DC/AC circuit 111 to reach 370 V. The inverter 11 is in the non-power-limited working state at the moment T6. Therefore, an adjusted bus voltage at this moment is the input voltage 370 V of the DC/AC circuit 111.

When T6<Time≤T7, the inverter 11 is in the non-power-limited working state. Therefore, the bus voltage in this time period is the input voltage 370 V of the DC/AC circuit 111.

In this embodiment, the inverter 11 may perform short-term adjustment on the bus voltage, and therefore it is ensured that a difference between a bus voltage that exists before the inverter 11 is switched from the power-limited working state to the non-power-limited working state and a bus voltage that exists after the inverter 11 is switched from the power-limited working state to the non-power-limited working state is reduced, so that the bus voltage of the inverter does not change greatly due to a change in the working state of the inverter. In this way, stability of the inverter 11 can be effectively improved, and therefore stability and working efficiency of the photovoltaic system 1 are improved, and there is high applicability.

It may be understood that the inverter 11 performs short-term control on the bus voltage, and therefore it is ensured that the bus voltage of the inverter 11 can be quickly restored after switching between the power-limited working state and the non-power-limited working state is performed, to reduce impact of a change in the working state of the inverter 11 on the bus voltage. In this way, stability of the inverter 11 is improved, and therefore stability of the photovoltaic system 1 is improved, and there is high applicability.

Figure 6:
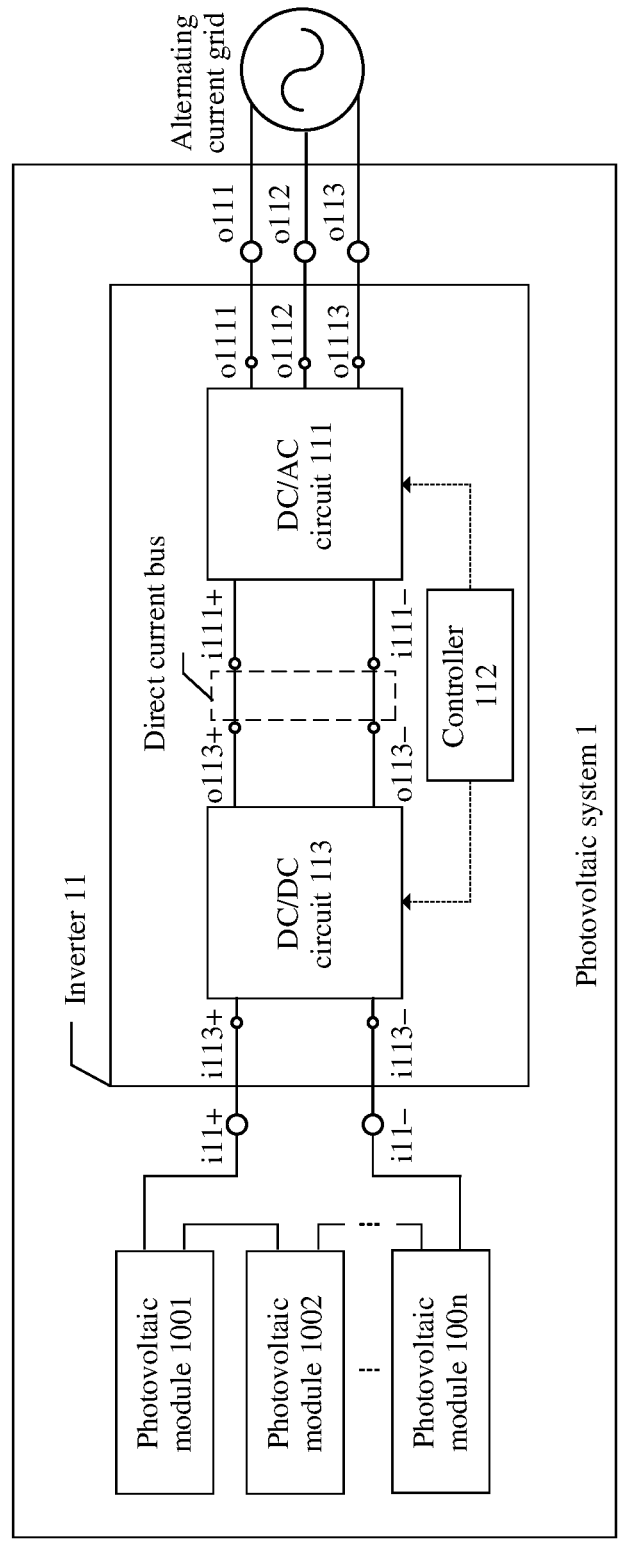
FIG. 6 is another schematic diagram of a structure of a photovoltaic system.

FIG. 6 is another schematic diagram of a structure of a photovoltaic system. As shown in FIG. 6, the photovoltaic system 1 includes an inverter 11. Input terminals i11+ and i11− of the inverter 11 are configured to be connected to a photovoltaic module 100*l*, a photovoltaic module 1002, . . . , and a photovoltaic module 100*n* that are connected in series, where n is a positive integer. Three output terminals o111, o112, and o113 of the inverter 11 are connected to an alternating current grid. The inverter 11 includes a DC/DC circuit 113, a DC/AC circuit 111, and a controller 112. The input terminals i11+ and i11− are respectively connected to a positive input terminal i113+ and a negative input terminal i113− of the DC/DC circuit 113. A positive output terminal o113+ and a negative output terminal o113− of the DC/DC circuit 113 are respectively connected to a positive input terminal i111+ and a negative input terminal i111− of the DC/AC circuit 111 by using a direct current bus. Three output terminals o1111, o1112, and o1113 of the DC/AC circuit 111 are respectively connected to o111, o112, and o113.

In an optional implementation, when the inverter 11 is switched from a non-power-limited working state to a power-limited working state, the inverter 11 adjusts a bus voltage of the inverter 11 to rise from a first voltage to a second voltage. After the inverter 11 is in the power-limited working state for a time interval, the bus voltage of the inverter 11 is adjusted to drop from the second voltage to a third voltage. The third voltage is less than or equal to the first voltage. When the inverter 11 is in the non-power-limited working state, the inverter 11 performs maximum power point tracking to maximize output power. When the inverter 11 is in the power-limited working state, the inverter 11 actively limits the output power.

In an optional embodiment, after the photovoltaic system 1 starts to work, the inverter 11 performs MPPT to maximize the output power of the inverter 11. In this case, the inverter 11 is in the non-power-limited working state. The controller 112 controls an output voltage of the DC/DC circuit 113 based on an output voltage reference value of the DC/DC circuit 113 that exists when the inverter 11 is in the non-power-limited working state, in other words, a control objective is to enable the output voltage of the DC/DC circuit 113 to reach the output voltage reference value of the DC/DC circuit 113. The output voltage reference value of the DC/DC circuit 113 that exists when the inverter 11 is in the non-power-limited working state is the second voltage. In addition, the controller 112 controls an input voltage of the DC/AC circuit 111 based on an input voltage reference value of the DC/AC circuit 111 that exists when the inverter 11 is in the non-power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the non-power-limited working state is the first voltage. When the inverter 11 is in the non-power-limited working state, the bus voltage is the input voltage of the DC/AC circuit 111, in other words, when the inverter 11 is in the non-power-limited working state, the bus voltage is the first voltage. The first voltage is that V1=Vg*1.4142+45, and the second voltage is that V2=Vg*1.4142+75, where Vg is an effective voltage value of the alternating current grid. When the alternating current grid is a single-phase grid, Vg=230 Vac, V1≈370 V, and V2≈400 V. When the alternating current grid is a three-phase grid, Vg=400 Vac, V1≈611 V, and V2≈641 V. Description is provided below by using an example in which the alternating current grid is a single-phase grid. It should be noted that in a working process of the inverter 11, the inverter 11 is in different working states due to impact of an external factor (including a change in external light or information indicating whether a power limiting instruction is received), and as a working state of the inverter 11 changes, the bus voltage changes between the output voltage of the DC/DC circuit 113 and the input voltage of the DC/AC circuit 111. The working state of the inverter 11 includes the power-limited working state and the non-power-limited working state. The non-power-limited working state means that the inverter performs MPPT to maximize the output power. The power-limited working state means that the inverter actively limits the output power. For example, photovoltaic power is greater than maximum output power of the inverter, or the inverter accepts power scheduling to limit the output power. For example, when the inverter 11 is in the non-power-limited working state because total power output by all the photovoltaic modules is insufficient due to a cloudy weather condition, the bus voltage is the input voltage of the DC/AC circuit 111; or when the inverter 11 is in the power-limited working state because total power output by all the photovoltaic modules is increased due to sufficient sunlight, the bus voltage is the output voltage of the DC/DC circuit 113.

Then, the inverter 11 is switched from the non-power-limited working state to the power-limited working state due to impact of an external factor. For example, after receiving a power limiting instruction, the controller 112 actively limits the output power of the inverter 11 based on the power limiting instruction. Therefore, the inverter 11 is switched from the non-power-limited working state to the power-limited working state. When the inverter 11 is in the non-power-limited working state, the bus voltage of the inverter 11 is the input voltage (namely, the first voltage 370 V) of the DC/AC circuit 111, and when the inverter 11 is in the power-limited working state, the bus voltage of the inverter 11 is the output voltage (namely, the second voltage 400 V) of the DC/DC circuit 113. Therefore, when the inverter 11 is switched from the non-power-limited working state to the power-limited working state, the bus voltage of the inverter 11 rises from the first voltage 370 V to the second voltage 400 V.

Then, after the inverter 11 runs in the power-limited working state for a time interval, the controller 112 adjusts the bus voltage of the inverter 11 to drop from the second voltage to the third voltage. The third voltage is less than or equal to the first voltage. Duration corresponding to the time interval in which the inverter 11 runs in the power-limited working state may approximately range from hundreds of milliseconds to several seconds.

In an optional embodiment, the controller 112 adjusts the output voltage reference value of the DC/DC circuit 113 to the input voltage reference value (namely, the first voltage 370 V) of the DC/AC circuit 111 that exists when the inverter 11 is in the non-power-limited working state, and adjusts the output voltage of the DC/DC circuit 113 based on the output voltage reference value of the DC/DC circuit 113 by controlling a working state (on or off) of each switching transistor in the DC/DC circuit 113, in other words, a control objective is to enable the output voltage of the DC/DC circuit 113 to reach 370 V. When the inverter 11 is in the power-limited working state, the bus voltage is the output voltage of the DC/DC circuit 113. Therefore, the output voltage of the DC/DC circuit 113 may be adjusted to drop the bus voltage of the inverter 11 from the second voltage 400 V to the third voltage 370 V. It may be understood that through short-term control of the bus voltage of the inverter 11, it is ensured that a bus voltage that exists before the inverter 11 is switched between the power-limited working state and the non-power-limited working state and a bus voltage that exists after the inverter 11 is switched between the power-limited working state and the non-power-limited working state are maintained as a same voltage, so that the bus voltage is not affected by a change in the working state of the inverter 11. In this way, stability of the inverter 11 is improved, and therefore stability of the photovoltaic system 1 is improved, and there is high applicability.

In another optional embodiment, the controller 112 adjusts the output voltage reference value of the DC/DC circuit 113 to the third voltage, where the third voltage is less than the first voltage 370 V, for example, 360 V, and adjusts the output voltage of the DC/DC circuit 113 based on the output voltage reference value of the DC/DC circuit 113 by controlling a working state (on or off) of each switching transistor in the DC/DC circuit 113, in other words, a control objective is to enable the output voltage of the DC/DC circuit 113 to reach 360 V. When the inverter 11 is in the power-limited working state, the bus voltage is the output voltage of the DC/DC circuit 113. Therefore, the output voltage of the DC/DC circuit 113 may be adjusted to drop the bus voltage of the inverter 11 from the second voltage 400 V to the third voltage 360 V. It should be noted that in actual application, to avoid a case in which a sine-wave alternating current cannot be normally output due to an excessively low bus voltage of the inverter 11, the third voltage may be greater than 340 V. It may be understood that through short-term control of the bus voltage of the inverter 11, it is ensured that a difference between a bus voltage that exists before the inverter 11 is switched between the power-limited working state and the non-power-limited working state and a bus voltage that exists after the inverter 11 is switched between the power-limited working state and the non-power-limited working state is reduced, so that the bus voltage is not affected by a change in the working state of the inverter 11. In this way, stability of the inverter 11 is improved, and therefore stability of the photovoltaic system 1 is improved. Further, when the bus voltage is slightly greater than a peak voltage of the alternating current grid, the inverter 11 may have the highest conversion efficiency. Therefore, the conversion efficiency of the inverter 11 can be improved, a loss of the inverter 11 can be reduced, and there is higher applicability.

In addition, after the inverter 11 runs in the power-limited working state for a time interval, the controller 112 further adjusts the input voltage reference value of the DC/AC circuit 111 to a fourth voltage V4=Vg*1.4142+15≈340 V, and adjusts the input voltage of the DC/AC circuit based on the input voltage reference value of the DC/AC circuit 111 by controlling a working state (on or off) of each switching transistor in the DC/AC circuit 111, in other words, a control objective is to enable the input voltage of the DC/AC circuit 111 to reach 340 V. The fourth voltage V4 is less than the input voltage reference value (namely, the first voltage V1) of the DC/AC circuit 111 that exists when the inverter 11 is in the non-power-limited working state.

It should be noted that the third voltage is greater than the peak voltage of the alternating current grid, and a first difference between the third voltage and the peak voltage of the alternating current grid is less than a first difference threshold. When the alternating current grid is a single-phase grid, Vg=230 Vac, and the peak voltage of the alternating current grid is approximately 325 Vac; or when the alternating current grid is a three-phase grid, Vg=400 Vac, and the peak voltage of the alternating current grid may be approximately 565 Vac.

It may be understood that, when the bus voltage is slightly greater than the peak voltage of the alternating current grid, the inverter may have the highest conversion efficiency, and a larger difference between the bus voltage and the peak voltage of the alternating current grid may indicate lower conversion efficiency of the inverter. After the inverter 11 is switched from the non-power-limited working state to the power-limited working state, the bus voltage may be controlled to be the third voltage through short-term adjustment. The third voltage is less than or equal to the first voltage V1, and therefore the difference between the bus voltage and the peak voltage of the alternating current grid can be effectively reduced when the inverter 11 is in the power-limited working state, and therefore the conversion efficiency can be effectively improved when the inverter 11 is in the power-limited working state.

Further, the first difference between the third voltage and the peak voltage of the alternating current grid is further greater than a second difference threshold, and the second difference threshold is less than the first difference threshold. Herein, a value of the first difference threshold is any value provided that a requirement that the conversion efficiency of the inverter 11 can be improved is met, and a value of the second difference threshold is any value provided that a requirement that the inverter 11 can work normally is met. For example, when the alternating current grid is a single-phase grid, the first difference threshold may be 70, and the second difference threshold may be 20.

It may be understood that after the inverter 11 is switched from the non-power-limited working state to the power-limited working state, the bus voltage is always controlled to be the third voltage, and the first difference between the third voltage and the peak voltage of the alternating current grid is greater than the second difference threshold. Therefore, a case in which the inverter 11 cannot normally output a sine-wave alternating current to the alternating current grid because when there is an excessively small first difference, the inverter 11 is likely to be affected by a fluctuation of the alternating current grid can be avoided. In this way, stability of the inverter 11 can be improved, and therefore stability of the photovoltaic system 1 is improved.

Figure 7:
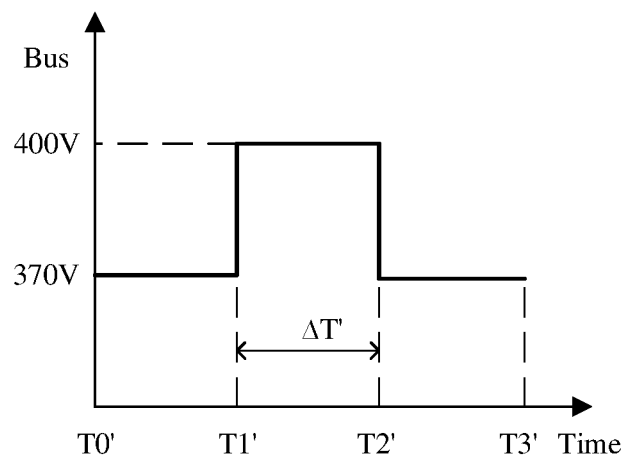
FIG. 7 is another schematic diagram of a bus voltage in a process in which an inverter is switched from a non-power-limited working state to a power-limited working state.

For ease of understanding, FIG. 7 is another schematic diagram of a bus voltage in a process in which an inverter is switched from a non-power-limited working state to a power-limited working state. As shown in FIG. 7, BUS is the bus voltage. When T0'≤Time<T1', the inverter 11 is in the non-power-limited working state. The controller 112 sets the output voltage reference value of the DC/DC circuit 113 to the second voltage 400 V, and sets the input voltage reference value of the DC/AC circuit 111 to the first voltage 370 V. In addition, the controller 112 controls the output voltage of the DC/DC circuit 113 based on the output voltage reference value of the DC/DC circuit 113, in other words, a control objective is to enable the output voltage of the DC/DC circuit 113 to reach 400 V, and controls the input voltage of the DC/AC circuit 111 based on the input voltage reference value of the DC/AC circuit 111, in other words, a control objective is to enable the input voltage of the DC/AC circuit 111 to reach 370 V. When T0'≤Time<T1', the inverter 11 is in the non-power-limited working state. Therefore, the bus voltage in this time period is the input voltage 370 V of the DC/AC circuit 111.

When Time=T1', the inverter 11 is in the power-limited working state due to an external factor (for example, a received power limiting instruction). The output power of the inverter 11 is less than input power of the inverter 11, and therefore the bus voltage starts to rise from 370 V to 400 V.

When T1'<Time<T2', the inverter 11 is in the power-limited working state. Therefore, the bus voltage in this time period is the output voltage 400 V of the DC/DC circuit 113. Herein, a time interval \T' corresponding to the case in which T1'<Time<T2' is the duration corresponding to the time interval in which the inverter 11 runs in the power-limited working state, and may approximately range from hundreds of milliseconds to several seconds, and the time interval is less than a time interval threshold.

When Time=T2', the controller 112 adjusts the output voltage reference value of the DC/DC circuit 113 from the second voltage 400 V to the third voltage 370 V, and adjusts the input voltage reference value of the DC/AC circuit 111 from the first voltage 370 V to the fourth voltage 340 V; and adjusts the output voltage of the DC/DC circuit 113 based on the output voltage reference value of the DC/DC circuit 113, in other words, a control objective is to enable the output voltage of the DC/DC circuit 113 to reach 370 V, and adjusts the input voltage of the DC/AC circuit 111 based on the input voltage reference value of the DC/AC circuit 111, in other words, a control objective is to enable the input voltage of the DC/AC circuit 111 to reach 340 V. The inverter 11 is in the power-limited working state at the moment T2. Therefore, an adjusted bus voltage at this moment is the output voltage 370 V of the DC/DC circuit 113.

When T2'<Time≤T3', the inverter 11 is in the power-limited working state. Therefore, the bus voltage in this time period is the output voltage 370 V of the DC/DC circuit 113.

In this embodiment, the inverter 11 may perform short-term adjustment on the bus voltage, and therefore it is ensured that a difference between a bus voltage that exists before the inverter 11 is switched from the non-power-limited working state to the power-limited working state and a bus voltage that exists after the inverter 11 is switched from the non-power-limited working state to the power-limited working state is reduced, so that the bus voltage of the inverter does not change greatly due to a change in the working state of the inverter. In this way, stability of the inverter 11 can be effectively improved, and therefore stability and working efficiency of the photovoltaic system 1 are improved. In addition, the bus voltage is controlled to be the third voltage, and the third voltage includes a minimum voltage that meets a grid connection requirement (namely, a requirement that the bus voltage may be greater than the peak voltage of the alternating current grid). Therefore, the conversion efficiency of the inverter 11 can be improved, and voltage stress of a switching device in the inverter 11 and a bus capacitor can be reduced. In this way, the loss of the inverter 11 and thermal stress of the internal switching device are reduced, and therefore a service life and reliability of the inverter 11 are further improved, and therefore a service life and reliability of the photovoltaic system 1 are further improved, and there is high applicability.

In another optional implementation, when the inverter 11 is switched from a power-limited working state to a non-power-limited working state, the inverter 11 adjusts a bus voltage of the inverter 11 to drop from a fifth voltage to a sixth voltage. After the inverter 11 is in the non-power-limited working state for a time interval, the bus voltage of the inverter 11 is adjusted to rise from the sixth voltage to a seventh voltage. The seventh voltage is greater than or equal to the fifth voltage. When the inverter 11 is in the non-power-limited working state, the inverter 11 performs MPPT to maximize output power. When the inverter 11 is in the power-limited working state, the inverter 11 actively limits the output power.

In an optional embodiment, after the photovoltaic system 1 starts to work, the inverter 11 is in the power-limited working state based on a received power limiting instruction. The controller 112 controls an output voltage of the DC/DC circuit 113 based on an output voltage reference value of the DC/DC circuit 113 that exists when the inverter 11 is in the power-limited working state, in other words, a control objective is to enable the output voltage of the DC/DC circuit 113 to reach the output voltage reference value of the DC/DC circuit 113. The output voltage reference value of the DC/DC circuit 113 that exists when the inverter 11 is in the power-limited working state is the fifth voltage. In addition, the controller 112 controls an input voltage of the DC/AC circuit 111 based on an input voltage reference value of the DC/AC circuit 111 that exists when the inverter 11 is in the power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the power-limited working state is the sixth voltage. When the inverter 11 is in the power-limited working state, the bus voltage is the output voltage of the DC/DC circuit 113, in other words, when the inverter 11 is in the power-limited working state, the bus voltage is the fifth voltage. The fifth voltage is that $V5=Vg*1.4142+45$, and the sixth voltage is that $V6=Vg*1.4142+15$, where $Vg$ is an effective voltage value of the alternating current grid. When the alternating current grid is a single-phase grid, $Vg=230$ Vac, $V5\approx370$ V, and $V6\approx340$ V. When the alternating current grid is a three-phase grid, $Vg=400$ Vac, $V5\approx611$ V, and $V6\approx581$ V. Description is provided below by using an example in which the alternating current grid is a single-phase grid.

It should be noted that in a working process of the inverter 11, the inverter 11 is in different working states due to impact of an external factor (including a change in external light or information indicating whether a power limiting instruction is received), and as a working state of the inverter 11 changes, the bus voltage changes between the output voltage of the DC/DC circuit 113 and the input voltage of the DC/AC circuit 111.

Then, the inverter 11 is switched from the power-limited working state to the non-power-limited working state due to impact of an external factor. For example, the inverter 11 is in the non-power-limited working state because the photovoltaic module outputs insufficient power due to a cloudy weather condition. Therefore, the inverter 11 is switched from the power-limited working state to the non-power-limited working state. When the inverter 11 is in the power-limited working state, the bus voltage of the inverter 11 is the output voltage (namely, the fifth voltage 370 V) of the DC/DC circuit 113, and when the inverter 11 is in the non-power-limited working state, the bus voltage of the inverter 11 is the input voltage (namely, the sixth voltage 340 V) of the DC/AC circuit 111. Therefore, when the inverter 11 is switched from the power-limited working state to the non-power-limited working state, the bus voltage of the inverter 11 drops from the fifth voltage 370 V to the sixth voltage 340 V.

Then, after the inverter 11 runs in the non-power-limited working state for a time interval, the controller 112 adjusts the bus voltage of the inverter 11 to rise from the sixth voltage to the seventh voltage. The seventh voltage is greater than or equal to the fifth voltage. Duration corresponding to the time interval in which the inverter 11 runs in the non-power-limited working state may approximately range from hundreds of milliseconds to several seconds.

In an optional embodiment, the controller 112 adjusts the input voltage reference value of the DC/AC circuit 111 to the output voltage reference value (namely, the fifth voltage 370 V) of the DC/DC circuit 113 that exists when the inverter 11 is in the power-limited working state, and adjusts the input voltage of the DC/AC circuit 111 based on the input voltage reference value of the DC/AC circuit 111 by controlling a working state (on or off) of each switching transistor in the DC/AC circuit 111, in other words, a control objective is to enable the input voltage of the DC/AC circuit 111 to reach 370 V. When the inverter 11 is in the non-power-limited working state, the bus voltage is the input voltage of the DC/AC circuit 111. Therefore, the input voltage of the DC/AC circuit 111 may be adjusted to rise the bus voltage of the inverter 11 from the sixth voltage 340 V to the seventh voltage 370 V. It may be understood that through short-term control of the bus voltage of the inverter 11, it is ensured that a bus voltage that exists before the inverter 11 is switched between the power-limited working state and the non-power-limited working state and a bus voltage that exists after the inverter 11 is switched between the power-limited working state and the non-power-limited working state are maintained as a same voltage, so that the bus voltage is not affected by a change in the working state of the inverter 11. In this way, stability of the inverter 11 is improved, and therefore stability of the photovoltaic system 1 is improved, and there is high applicability.

In another optional embodiment, the controller 112 adjusts the input voltage reference value of the DC/AC circuit 111 to the seventh voltage, where the seventh voltage is greater than the fifth voltage 370 V, for example, 375 V, and adjusts the input voltage of the DC/AC circuit 111 based on the input voltage reference value of the DC/AC circuit 111 by controlling a working state (on or off) of each switching transistor in the DC/AC circuit 111, in other words, a control objective is to enable the input voltage of the DC/AC circuit 111 to reach 375 V. When the inverter 11 is in the non-power-limited working state, the bus voltage is the input voltage of the DC/AC circuit 111. Therefore, the input voltage of the DC/AC circuit 111 may be adjusted to rise the bus voltage of the inverter 11 from the sixth voltage 340 V to the seventh voltage 375 V. It should be noted that in actual application, to avoid a case in which the inverter 11 has excessively low conversion efficiency due to an excessively large difference between the bus voltage of the inverter 11 and a peak voltage of the alternating current grid, the seventh voltage may be greater than the peak voltage of the alternating current grid, and a second difference between the seventh voltage and the peak voltage of the alternating current grid may be less than a third difference threshold. It may be understood that through short-term control of the bus voltage of the inverter 11, it is ensured that a difference between a bus voltage that exists before the inverter 11 is switched between the power-limited working state and the non-power-limited working state and a bus voltage that exists after the inverter 11 is switched between the power-limited working state and the non-power-limited working state is reduced, so that the bus voltage is not affected by a change in the working state of the inverter 11. In this way, stability of the inverter 11 is improved, and therefore stability of the photovoltaic system 1 is improved.

In addition, after the inverter 11 runs in the non-power-limited working state for a time interval, the controller 112 further adjusts the output voltage reference value of the DC/DC circuit 113 to an eight voltage V8=Vg*1.4142+75≈400 V, and adjusts the output voltage of the DC/DC circuit based on the output voltage reference value of the DC/DC circuit 113 by controlling a working state (on or off) of each switching transistor in the DC/DC circuit 113, in other words, a control objective is to enable the output voltage of the DC/DC circuit 113 to reach 400 V. The eighth voltage V8 is greater than the output voltage reference value (namely, the fifth voltage V5) of the DC/DC circuit 113 that exists when the inverter 11 is in the power-limited working state.

It should be noted that the second difference between the seventh voltage and the peak voltage of the alternating current grid is further greater than a fourth difference threshold, and the fourth difference threshold is less than the third difference threshold. Therefore, a case in which the inverter 11 cannot normally output a sine-wave alternating current due to an excessively small difference between the bus voltage and the peak voltage of the alternating current grid can be effectively avoided. In this way, stability of the inverter 11 can be improved, and therefore stability of the photovoltaic system 1 is improved.

Figure 8:
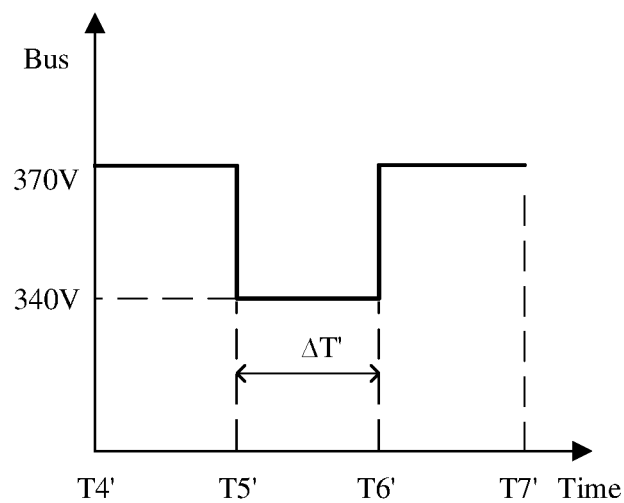
FIG. 8 is another schematic diagram of a bus voltage in a process in which an inverter is switched from a power-limited working state to a non-power-limited working state.

For ease of understanding, FIG. 8 is another schematic diagram of a bus voltage in a process in which an inverter is switched from a power-limited working state to a non-power-limited working state. As shown in FIG. 8, BUS is the bus voltage. When T4'≤Time<T5', the inverter 11 is in the power-limited working state. The controller 112 sets the output voltage reference value of the DC/DC circuit 113 to the fifth voltage 370 V, and sets the input voltage reference value of the DC/AC circuit 111 to the sixth voltage 340 V. In addition, the controller 112 controls the output voltage of the DC/DC circuit 113 based on the output voltage reference value of the DC/DC circuit 113, in other words, a control objective is to enable the output voltage of the DC/DC circuit 113 to reach 370 V, and controls the input voltage of the DC/AC circuit 111 based on the input voltage reference value of the DC/AC circuit 111, in other words, a control objective is to enable the input voltage of the DC/AC circuit 111 to reach 340 V. When T4'≤Time<T5', the inverter 11 is in the power-limited working state. Therefore, the bus voltage in this time period is the output voltage 370 V of the DC/DC circuit 113.

When Time=T5', the inverter 11 is in the non-power-limited working state due to an external factor (for example, higher sunlight intensity). When the inverter 11 is in the non-power-limited working state, the bus voltage is the input voltage of the DC/AC circuit 111, and therefore the bus voltage starts to drop from 370 V to 340 V.

When T5'<Time<T6', the inverter 11 is in the non-power-limited working state. Therefore, the bus voltage in this time period is the input voltage 340 V of the DC/AC circuit 111. Herein, a time interval \T' corresponding to the case in which T5'<Time<T6' is the duration corresponding to the time interval in which the inverter 11 runs in the non-power-limited working state and may approximately range from hundreds of milliseconds to several seconds, and the time interval is less than a time interval threshold.

When Time=T6', the controller 112 adjusts the output voltage reference value of the DC/DC circuit 113 from the fifth voltage 370 V to the eighth voltage 400 V, and adjusts the input voltage reference value of the DC/AC circuit 111 from the sixth voltage 340 V to the seventh voltage 370 V; and adjusts the output voltage of the DC/DC circuit 113 based on the output voltage reference value of the DC/DC circuit 113, in other words, a control objective is to enable the output voltage of the DC/DC circuit 113 to reach 400 V, and adjusts the input voltage of the DC/AC circuit 111 based on the input voltage reference value of the DC/AC circuit 111, in other words, a control objective is to enable the input voltage of the DC/AC circuit 111 to reach 370 V. The inverter 11 is in the non-power-limited working state at the moment T6'. Therefore, an adjusted bus voltage at this moment is the output voltage 370 V of the DC/AC circuit 111.

When T6'<Time≤T7', the inverter 11 is in the non-power-limited working state. Therefore, the bus voltage in this time period is the input voltage 370 V of the DC/AC circuit 111.

In this embodiment, the inverter 11 may perform short-term adjustment on the bus voltage, and therefore it is ensured that a difference between a bus voltage that exists before the inverter 11 is switched from the power-limited working state to the non-power-limited working state and a bus voltage that exists after the inverter 11 is switched from the power-limited working state to the non-power-limited working state is reduced, so that the bus voltage of the inverter does not change greatly due to a change in the working state of the inverter. In this way, stability of the inverter 11 can be effectively improved, and therefore stability and working efficiency of the photovoltaic system 1 are improved, and there is high applicability.

It may be understood that the inverter 11 performs short-term control on the bus voltage, and therefore it is ensured that the bus voltage of the inverter 11 can be quickly restored after switching between the power-limited working state and the non-power-limited working state is performed, to reduce impact of a change in the working state of the inverter 11 on the bus voltage. In this way, stability of the inverter 11 is improved, and therefore stability of the photovoltaic system 1 is improved, and there is high applicability.

Figure 9:
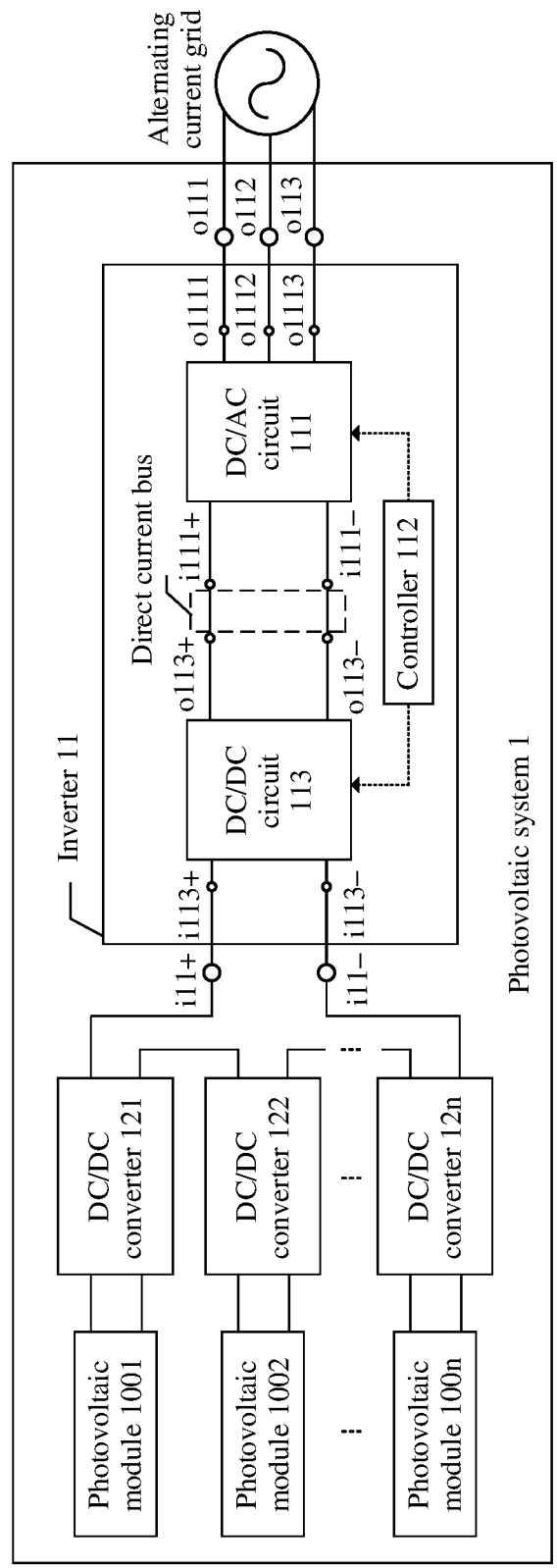
FIG. 9 is still another schematic diagram of a structure of a photovoltaic system.

Further, the photovoltaic system 1 shown in FIG. 6 may further include a DC/DC converter. For details, refer to a photovoltaic system shown in FIG. 9. As shown in FIG. 9, the photovoltaic system 1 further includes a DC/DC converter 121, . . . , and a DC/DC converter 12n, where n is a positive integer. An input terminal of the DC/DC converter 121 is connected to a photovoltaic module 100l, . . . , and an input terminal of the DC/DC converter 12n is connected to a photovoltaic module 100n. An output terminal of the DC/DC converter 121, . . . , and an output terminal of the DC/DC converter 12n are connected in series, and then a positive output terminal of the DC/DC converter 121 is connected to a positive input terminal i11+ of an inverter 11, and a negative output terminal of the DC/DC converter 12n is connected to a negative input terminal i11− of the inverter 11. It may be understood that working principles of the photovoltaic system 1 and the inverter 11 shown in FIG. 9 are the same as working principles of the photovoltaic system 1 and the inverter 11 shown in FIG. 6. Details are not described herein.

Figure 10:
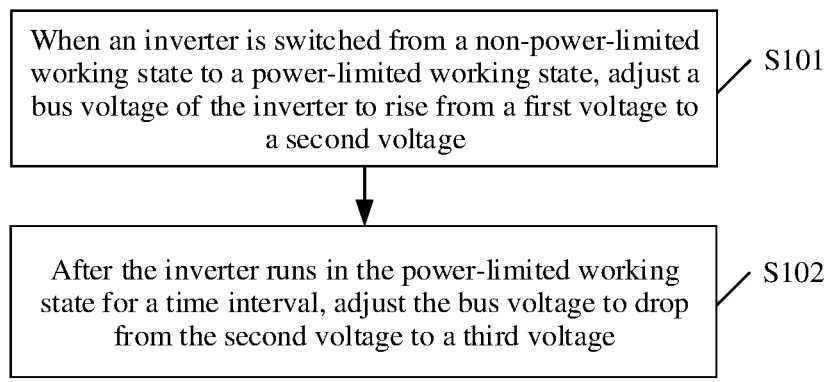
FIG. 10 is a schematic flowchart of a bus voltage control method for an inverter.

FIG. 10 is a schematic flowchart of a bus voltage control method for an inverter. The bus voltage control method for an inverter provided in this embodiment may be applicable to the controller 112 in the photovoltaic system 1 shown in each of FIG. 2, FIG. 3, FIG. 6, and FIG. 9. The bus voltage control method for an inverter may include the following steps.

S101. When the inverter is switched from a non-power-limited working state to a power-limited working state, adjust a bus voltage of the inverter to rise from a first voltage to a second voltage.

When the inverter is in the non-power-limited working state, the inverter performs maximum power point tracking to maximize output power. When the inverter is in the power-limited working state, the inverter actively limits the output power.

In an optional implementation, when the inverter is located in the photovoltaic system shown in FIG. 2 or FIG. 3, after the photovoltaic system 1 starts to work, the inverter 11 performs MPPT to maximize the output power of the inverter 11. In this case, the inverter 11 is in the non-power-limited working state. The controller 112 controls a sum of output voltages of n DC/DC converters based on a sum of output voltage reference values of the n DC/DC converters that exist when the inverter 11 is in the non-power-limited working state, in other words, a control objective is to enable the sum of the output voltages of the n DC/DC converters to reach the sum of the output voltage reference values of the n DC/DC converters. The sum of the output voltage reference values of the n DC/DC converters that exist when the inverter 11 is in the non-power-limited working state is the second voltage. In addition, the controller 112 controls an input voltage of a DC/AC circuit 111 based on an input voltage reference value of the DC/AC circuit 111 that exists when the inverter 11 is in the non-power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the non-power-limited working state is the first voltage. When the inverter 11 is in the non-power-limited working state, the bus voltage is the input voltage of the DC/AC circuit 111, in other words, when the inverter 11 is in the non-power-limited working state, the bus voltage is the first voltage.

Then, the inverter 11 is switched from the non-power-limited working state to the power-limited working state due to impact of an external factor. When the inverter 11 is in the non-power-limited working state, the bus voltage of the inverter 11 is the input voltage (namely, the first voltage) of the DC/AC circuit 111, and when the inverter 11 is in the power-limited working state, the bus voltage of the inverter 11 is the sum (namely, the second voltage) of the output voltages of the n DC/DC converters. Therefore, when the inverter 11 is switched from the non-power-limited working state to the power-limited working state, the bus voltage of the inverter 11 rises from the first voltage to the second voltage.

In another optional implementation, when the inverter is located in the photovoltaic system shown in FIG. 6 or FIG. 9, after the photovoltaic system 1 starts to work, the inverter 11 performs MPPT to maximize the output power of the inverter 11. In this case, the inverter 11 is in the non-power-limited working state. The controller 112 controls an output voltage of a DC/DC circuit 113 based on an output voltage reference value of the DC/DC circuit 113 that exists when the inverter 11 is in the non-power-limited working state, in other words, a control objective is to enable the output voltage of the DC/DC circuit 113 to reach the output voltage reference value of the DC/DC circuit 113. The output voltage reference value of the DC/DC circuit 113 that exists when the inverter 11 is in the non-power-limited working state is the second voltage. In addition, the controller 112 controls an input voltage of a DC/AC circuit 111 based on an input voltage reference value of the DC/AC circuit 111 that exists when the inverter 11 is in the non-power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the non-power-limited working state is the first voltage. When the inverter 11 is in the non-power-limited working state, the bus voltage is the input voltage of the DC/AC circuit 111, in other words, when the inverter 11 is in the non-power-limited working state, the bus voltage is the first voltage.

Then, the inverter 11 is switched from the non-power-limited working state to the power-limited working state due to impact of an external factor. When the inverter 11 is in the non-power-limited working state, the bus voltage of the inverter 11 is the input voltage (namely, the first voltage) of the DC/AC circuit 111, and when the inverter 11 is in the power-limited working state, the bus voltage of the inverter 11 is the output voltage (namely, the second voltage) of the DC/DC circuit 113. Therefore, when the inverter 11 is switched from the non-power-limited working state to the power-limited working state, the bus voltage of the inverter 11 rises from the first voltage to the second voltage.

S102. After the inverter runs in the power-limited working state for a time interval, adjust the bus voltage to drop from the second voltage to a third voltage.

The third voltage is less than or equal to the first voltage, and duration corresponding to the time interval in which the inverter 11 runs in the power-limited working state may approximately range from hundreds of milliseconds to several seconds.

In an optional implementation, when the inverter is located in the photovoltaic system shown in FIG. 2 or FIG. 3, the controller 112 adjusts the sum of the output voltage reference values of the n DC/DC converters to the third voltage and sends voltage adjustment instructions to all of the n DC/DC converters. All the DC/DC converters adjust respective output voltages based on output voltage reference values carried in the respectively received voltage adjustment instructions, in other words, a control objective is to enable the sum of the output voltages of the n DC/DC converters to reach the third voltage. The sum of the output voltage reference values of the n DC/DC converters is the sum of the output voltage reference values of the n DC/DC converters. When the inverter 11 is in the power-limited working state, the bus voltage is the sum of the output voltages of the n DC/DC converters. Therefore, the sum of the output voltages of the n DC/DC converters may be adjusted to drop the bus voltage of the inverter 11 from the second voltage to the third voltage.

In another optional implementation, when the inverter is located in the photovoltaic system in FIG. 6 or FIG. 9, the controller 112 adjusts the output voltage reference value of the DC/DC circuit 113 to the third voltage, and adjusts the output voltage of the DC/DC circuit 113 based on the output voltage reference value of the DC/DC circuit 113 by controlling a working state (on or off) of each switching transistor in the DC/DC circuit 113, in other words, a control objective is to enable the output voltage of the DC/DC circuit 113 to reach the third voltage. When the inverter 11 is in the power-limited working state, the bus voltage is the output voltage of the DC/DC circuit 113. Therefore, the output voltage of the DC/DC circuit 113 may be adjusted to drop the bus voltage of the inverter 11 from the second voltage to the third voltage.

For more operations performed by the inverter in the bus voltage control method for an inverter, refer to the implementations performed by the controller 112 in the photovoltaic system 1 shown in each of FIG. 2, FIG. 3, FIG. 6, and FIG. 9. Details are not described herein.

In this embodiment, the inverter may perform short-term adjustment on the bus voltage, and therefore it is ensured that a difference between a bus voltage that exists before the inverter is switched from the non-power-limited working state to the power-limited working state and a bus voltage that exists after the inverter is switched from the power-limited working state to the non-power-limited working state is reduced, so that the bus voltage of the inverter does not change greatly due to a change in a working state of the inverter. In this way, stability of the inverter can be effectively improved, and therefore stability and working efficiency of the photovoltaic system are improved. In addition, the bus voltage is controlled to be the third voltage, and the third voltage includes a minimum voltage that meets a grid connection requirement. Therefore, conversion efficiency of the inverter can be improved, and voltage stress of a switching device in the inverter and a bus capacitor can be reduced. In this way, a loss of the inverter and thermal stress of the internal switching device are reduced, and therefore a service life and reliability of the inverter are further improved, and therefore a service life and reliability of the photovoltaic system are further improved, and there is high applicability.

Figure 11:
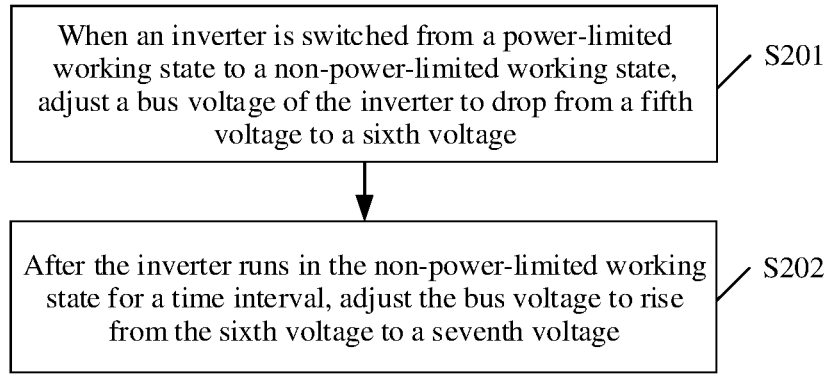
FIG. 11 is another schematic flowchart of a bus voltage control method for an inverter.

FIG. 11 is another schematic flowchart of a bus voltage control method for an inverter. The bus voltage control method for an inverter provided in this embodiment may be applicable to the controller 112 in the photovoltaic system 1 shown in each of FIG. 2, FIG. 3, FIG. 6, and FIG. 9. The bus voltage control method for an inverter may include the following steps.

S201. When the inverter is switched from a power-limited working state to a non-power-limited working state, adjust a bus voltage of the inverter to drop from a fifth voltage to a sixth voltage.

In an optional implementation, when the inverter is located in the photovoltaic system shown in FIG. 2 or FIG. 3, after the photovoltaic system 1 starts to work, the inverter 11 is in the power-limited working state based on a received power limiting instruction. The controller 112 controls a sum of output voltages of n DC/DC converters based on a sum of output voltage reference values of the n DC/DC converters that exist when the inverter 11 is in the power-limited working state, in other words, a control objective is to enable the sum of the output voltages of the n DC/DC converters to reach the sum of the output voltage reference values of the n DC/DC converters. The sum of the output voltage reference values of the n DC/DC converters that exist when the inverter 11 is in the power-limited working state is the fifth voltage. In addition, the controller 112 controls an input voltage of a DC/AC circuit 111 based on an input voltage reference value of the DC/AC circuit 111 that exists when the inverter 11 is in the power-limited working state, in other words, a control objective is to enable the input voltage of the DC/AC circuit 111 to reach the input voltage reference value of the DC/AC circuit 111. The input voltage reference value of the DC/AC circuit 111 is the sixth voltage. When the inverter 11 is in the power-limited working state, the bus voltage is the sum of the output voltages of the n DC/DC converters, in other words, when the inverter 11 is in the power-limited working state, the bus voltage is the fifth voltage.

Then, the inverter 11 is switched from the power-limited working state to the non-power-limited working state due to impact of an external factor. When the inverter 11 is in the power-limited working state, the bus voltage of the inverter 11 is the sum (namely, the fifth voltage) of the output voltages of the n DC/DC converters, and when the inverter 11 is in the non-power-limited working state, the bus voltage of the inverter 11 is the input voltage (namely, the sixth voltage) of the DC/AC circuit 111. Therefore, when the inverter 11 is switched from the power-limited working state to the non-power-limited working state, the bus voltage of the inverter 11 drops from the fifth voltage to the sixth voltage.

In another optional implementation, when the inverter is located in the photovoltaic system shown in FIG. 6 or FIG. 9, after the photovoltaic system 1 starts to work, the inverter 11 is in the power-limited working state based on a received power limiting instruction. The controller 112 controls an output voltage of a DC/DC circuit 113 based on an output voltage reference value of the DC/DC circuit 113 that exists when the inverter 11 is in the power-limited working state, in other words, a control objective is to enable the output voltage of the DC/DC circuit 113 to reach the output voltage reference value of the DC/DC circuit 113. The output voltage reference value of the DC/DC circuit 113 that exists when the inverter 11 is in the power-limited working state is the fifth voltage. In addition, the controller 112 controls an input voltage of a DC/AC circuit 111 based on an input voltage reference value of the DC/AC circuit 111 that exists when the inverter 11 is in the power-limited working state, in other words, a control objective is to enable the input voltage of the DC/AC circuit 111 to reach the input voltage reference value of the DC/AC circuit 111. The input voltage reference value of the DC/AC circuit 111 that exists when the inverter 11 is in the non-power-limited working state is the sixth voltage. When the inverter 11 is in the power-limited working state, the bus voltage is the output voltage of the DC/DC circuit 113, in other words, when the inverter 11 is in the power-limited working state, the bus voltage is the fifth voltage.

Then, the inverter 11 is switched from the power-limited working state to the non-power-limited working state due to impact of an external factor. When the inverter 11 is in the power-limited working state, the bus voltage of the inverter 11 is the output voltage (namely, the fifth voltage) of the DC/DC circuit 113, and when the inverter 11 is in the non-power-limited working state, the bus voltage of the inverter 11 is the input voltage (namely, the sixth voltage) of the DC/AC circuit 111. Therefore, when the inverter 11 is switched from the power-limited working state to the non-power-limited working state, the bus voltage of the inverter 11 drops from the fifth voltage to the sixth voltage.

S202. After the inverter runs in the non-power-limited working state for a time interval, adjust the bus voltage to rise from the sixth voltage to a seventh voltage.

The seventh voltage is greater than or equal to the fifth voltage, and duration corresponding to the time interval in which the inverter 11 runs in the non-power-limited working state may approximately range from hundreds of milliseconds to several seconds.

In an optional implementation, the controller 112 adjusts the input voltage reference value of the DC/AC circuit 111 to the seventh voltage, and adjusts the input voltage of the DC/AC circuit 111 based on the input voltage reference value of the DC/AC circuit 111 by controlling a working state (on or off) of each switching transistor in the DC/AC circuit 111, in other words, a control objective is to enable the input voltage of the DC/AC circuit 111 to reach the seventh voltage. When the inverter 11 is in the non-power-limited working state, the bus voltage is the input voltage of the DC/AC circuit 111. Therefore, the input voltage of the DC/AC circuit 111 may be adjusted to rise the bus voltage of the inverter 11 from the sixth voltage to the seventh voltage.

For more operations performed by the inverter in the bus voltage control method for an inverter, refer to the implementations performed by the controller 112 in the photovoltaic system 1 shown in each of FIG. 2, FIG. 3, FIG. 6, and FIG. 9. Details are not described herein.

In this embodiment, the inverter may perform short-term adjustment on the bus voltage, and therefore it is ensured that a difference between a bus voltage that exists before the inverter is switched from the power-limited working state to the non-power-limited working state and a bus voltage that exists after the inverter is switched from the power-limited working state to the non-power-limited working state is reduced, so that the bus voltage of the inverter does not change greatly due to a change in a working state of the inverter. In this way, stability of the inverter can be effectively improved, and therefore stability and working efficiency of the photovoltaic system are improved, and there is high applicability.

The foregoing descriptions are merely implementations, but are not intended to limit the scope of the embodiments. Any variation or replacement readily figured out by a person skilled in the art shall fall within the scope of the embodiments.

What is claimed is:

1. A photovoltaic system, comprising:
   at least one DC/DC converter and
   an inverter, wherein an input terminal of the at least one DC/DC converter is configured to be connected to a photovoltaic module; and an output terminal of the at least one DC/DC converter is configured to be connected to an input terminal of the inverter by using a direct current bus, and an output terminal of the inverter is configured to be connected to an alternating current grid;
   when the inverter is switched from a non-power-limited working state to a power-limited working state, the inverter is configured to adjust a bus voltage of the inverter to rise from a first voltage to a second voltage,
   when the inverter is in the non-power-limited working state, the inverter is configured to performs maximum power point tracking to maximize output power,
   when the inverter is in the power-limited working state, the inverter is configured to actively limits the output power, and
   after running in the power-limited working state for a time interval, the inverter is configured to adjust the bus voltage to drop from the second voltage to a third voltage, wherein the third voltage is less than or equal to the first voltage.

2. The photovoltaic system according to claim 1, wherein output terminals of the at least one DC/DC converter are connected in series and then connected to the input terminal of the inverter through the direct current bus, and the inverter comprises a DC/AC circuit, and an input terminal of the DC/AC circuit is connected to the input terminal of the inverter; and
   the inverter is further configured to:
   obtain the first voltage through controlling based on an input voltage reference value of the DC/AC circuit that exists when the inverter is configured to be in the non-power-limited working state, and
   obtain the second voltage through controlling based on a sum of output voltage reference values of the at least one DC/DC converter that exists when the inverter is configured to be in the non-power-limited working state.

3. The photovoltaic system according to claim 2, wherein the inverter is further configured to:
   adjust the sum of the output voltage reference values of the at least one DC/DC converter to the input voltage reference value of the DC/AC circuit that exists when the inverter is configured to be in the non-power-limited working state, and
   adjust the sum of the output voltages of the at least one DC/DC converter based on the sum of the output voltage reference values of the at least one DC/DC converter; and the bus voltage that exists when the inverter is configured to be in the power-limited working state is the sum of the output voltages of the at least one DC/DC converter.

4. The photovoltaic system according to claim 2, wherein the inverter is further configured to:
   adjust the input voltage reference value of the DC/AC circuit to a fourth voltage, and
   adjust the input voltage of the DC/AC circuit based on the input voltage reference value of the DC/AC circuit; and the fourth voltage is less than the input voltage reference value of the DC/AC circuit that exists when the inverter is configured to be in the non-power-limited working state.

5. A photovoltaic system comprising:
   an inverter that comprises a DC/DC circuit and a DC/AC circuit, wherein an input terminal of the inverter is configured to be connected to a photovoltaic module, an output terminal of the DC/DC circuit is configured to be connected to an input terminal of the DC/AC circuit by using a direct current bus, and an output terminal of the inverter is configured to be connected to an alternating current grid;
   when the inverter is switched from a non-power-limited working state to a power-limited working state, the inverter is configured to adjust a bus voltage of the inverter to rise from a first voltage to a second voltage,
   when the inverter is in the non-power-limited working state, the inverter is configured to performs maximum power point tracking to maximize output power,
   when the inverter is in the power-limited working state, the inverter is configured to actively limits the output power; and
   after running in the power-limited working state for a time interval, the inverter is configured to adjusts the bus voltage to drop from the second voltage to a third voltage, wherein the third voltage is less than or equal to the first voltage.

6. The photovoltaic system according to claim 5, wherein the inverter is further configured to:

obtain the first voltage through controlling based on an input voltage reference value of the DC/AC circuit that exists when the inverter is configured to be in the non-power-limited working state, and obtain the second voltage through controlling based on an output voltage reference value of the DC/DC circuit that exists when the inverter is configured to be in the non-power-limited working state.

7. The photovoltaic system according to claim 5, wherein the inverter is further configured to:

adjust the output voltage reference value of the DC/DC circuit to the input voltage reference value of the DC/AC circuit that exists when the inverter is configured to be in the non-power-limited working state, and adjust the output voltage of the DC/DC circuit based on the output voltage reference value of the DC/DC circuit; and the bus voltage that exists when the inverter is configured to be in the power-limited working state is the output voltage of the DC/DC circuit.

8. A photovoltaic system comprising:

at least one DC/DC converter; and an inverter, wherein and an input terminal of the at least one DC/DC converter is configured to be connected to a photovoltaic module, an output terminal of the at least one DC/DC converter is configured to be connected to an input terminal of the inverter by using a direct current bus, and an output terminal of the inverter is configured to be connected to an alternating current grid;

when the inverter is switched from a power-limited working state to a non-power-limited working state, the inverter is configured to: adjust a bus voltage of the inverter to drop from a fifth voltage to a sixth voltage, when the inverter is in the non-power-limited working state, the inverter is configured to performs maximum power point tracking to maximize output power, when the inverter is in the power-limited working state, the inverter is configured to actively limits the output power, and after running in the non-power-limited working state for a time interval, the inverter is configured to adjusts the bus voltage to rise from the sixth voltage to a seventh voltage, wherein the seventh voltage is greater than or equal to the fifth voltage.

9. The photovoltaic system according to claim 8, wherein output terminals of the at least one DC/DC converter are connected in series and then connected to the input terminal of the inverter by using the direct current bus, the inverter further comprises a DC/AC circuit, and an input terminal of the DC/AC circuit is connected to the input terminal of the inverter, and the inverter is further configured to:

obtain the fifth voltage through controlling based on a sum of output voltage reference values of the at least one DC/DC converter that exists when the inverter is configured to be in the power-limited working state, and obtain the sixth voltage through controlling based on an input voltage reference value of the DC/AC circuit that exists when the inverter is configured to be in the power-limited working state.

10. The photovoltaic system according to claim 9, wherein the inverter is further configured to:

adjust the input voltage reference value of the DC/AC circuit to the sum of the output voltage reference values of the at least one DC/DC converter that exists when the inverter is configured to be in the power-limited working state, and adjust the input voltage of the DC/AC circuit based on the input voltage reference value of the DC/AC circuit; and the bus voltage that exists when the inverter is configured to be in the non-power-limited working state is the input voltage of the DC/AC circuit.

11. The photovoltaic system according to claim 8, wherein the inverter is further configured to:

adjust the sum of the output voltage reference values of the at least one DC/DC converter to an eighth voltage, and adjust the sum of the output voltage reference values of the at least one DC/DC converter based on the sum of the output voltage reference values of the at least one DC/DC converter; and the eighth voltage is greater than the sum of the output voltage reference values of the at least one DC/DC converter that exists when the inverter is configured to be in the power-limited working state.

12. A photovoltaic system comprising:

an inverter comprising a DC/DC circuit and a DC/AC circuit, wherein an input terminal of the inverter is configured to be connected to a photovoltaic module, an output terminal of the DC/DC circuit is configured to be connected to an input terminal of the DC/AC circuit by using a direct current bus, and an output terminal of the inverter is configured to be connected to an alternating current grid, when the inverter is switched from a power-limited working state to a non-power-limited working state, the inverter is configured to: adjust a bus voltage of the inverter to drop from a fifth voltage to a sixth voltage, when the inverter is in the non-power-limited working state, the inverter is configured to performs maximum power point tracking to maximize output power, when the inverter is in the power-limited working state, the inverter is configured to actively limits the output power; and after running in the non-power-limited working state for a time interval, the inverter is configured to adjusts the bus voltage to rise from the sixth voltage to a seventh voltage, wherein the seventh voltage is greater than or equal to the fifth voltage.

13. The photovoltaic system according to claim 12, wherein the inverter is further configured to:

obtain the fifth voltage through controlling based on an output voltage reference value of the DC/DC circuit that exists when the inverter is configured to be in the power-limited working state, and obtain the sixth voltage-through controlling based on an input voltage reference value of the DC/AC circuit that exists when the inverter is configured to be in the power-limited working state.

14. The photovoltaic system according to claim 12, wherein the inverter is further configured to:

adjust an input voltage reference value of the DC/AC circuit to the output voltage reference value of the DC/DC circuit that exists when the inverter is configured to be in the power-limited working state, and adjust an input voltage of the DC/AC circuit based on the input voltage reference value of the DC/AC circuit; and the bus voltage that exists when the inverter is configured to be in the non-power-limited working state is the input voltage of the DC/AC circuit.

15. The photovoltaic system according to claim 12, wherein the inverter is further configured to:

adjust the output voltage reference value of the DC/DC circuit to an eighth voltage, and adjust the output voltage of the DC/DC circuit based on the output voltage reference value of the DC/DC circuit; and the eighth voltage is greater than the output voltage reference value of the DC/DC circuit that exists when the inverter is configured to be in the power-limited working state.

16. The photovoltaic system according to claim 12, wherein output terminals of the at least one DC/DC converter are configured to be connected in series and then configured to be connected to the input terminal of the inverter by using the direct current bus, the inverter further comprises a DC/AC circuit, an input terminal of the DC/AC circuit is configured to be connected to the input terminal of the inverter; and the inverter is further configured to:

adjust a sum of output voltage reference values of the at least one DC/DC converter to an input voltage reference value of the DC/AC circuit that exists when the inverter is configured to be in the non-power-limited working state, and adjust a sum of output voltages of the at least one DC/DC converter based on the sum of the output voltage reference values of the at least one DC/DC converter; and the bus voltage that exists when the inverter is configured to be in the power-limited working state is the sum of the output voltages of the at least one DC/DC converter.

17. The photovoltaic system according to claim 12, wherein the inverter is further configured to:

adjust an output voltage reference value of the DC/DC circuit to an input voltage reference value of the DC/AC circuit that exists when the inverter is configured to be in the non-power-limited working state, and adjust an output voltage of the DC/DC circuit based on the output voltage reference value of the DC/DC circuit and the bus voltage that exists when the inverter is configured to be in the power-limited working state is the output voltage of the DC/DC circuit.

* * * * *

UNITED STATES PATENT AND TRADEMARK OFFICE
CERTIFICATE OF CORRECTION

| | | |
|---|---|---|
| PATENT NO. | : 12,107,534 B2 | Page 1 of 1 |
| APPLICATION NO. | : 17/994632 | |
| DATED | : October 1, 2024 | |
| INVENTOR(S) | : Zhiwu Xu et al. | |

It is certified that error appears in the above-identified patent and that said Letters Patent is hereby corrected as shown below:

In the Claims

Column 35, Claim 1, Line 58, please change from "configured to performs" to "configured to perform".

Column 35, Claim 1, Line 61, please change from "configured to actively limits" to "configured to actively limit".

Column 36, Claim 5, Line 56, please change from "configured to performs" to "configured to perform".

Column 36, Claim 5, Line 59, please change from "actively limits" to "actively limit".

Column 36, Claim 5, Line 62, please change from "configured to adjusts" to "configured to adjust".

Column 37, Claim 8, Line 35, please change from "configured to performs" to "configured to perform".

Column 37, Claim 8, Line 38, please change from "actively limits" to "actively limit".

Column 37, Claim 8, Line 41, please change from "configured to adjusts" to "configured to adjust".

Column 38, Claim 12, Line 33, please change from "configured to performs" to "configured to perform".

Column 38, Claim 12, Line 36, please change from "actively limits" to "actively limit".

Column 38, Claim 12, Line 39, please change from "configured to adjusts" to "configured to adjust".

Signed and Sealed this
Thirty-first Day of December, 2024

Derrick Brent
*Acting Director of the United States Patent and Trademark Office*